US012440808B2

(12) United States Patent
Liu et al.

(10) Patent No.: US 12,440,808 B2
(45) Date of Patent: Oct. 14, 2025

(54) POLYMER-BASED FILM, PREPARATION METHOD THEREFOR, AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yiqun Liu, Beijing (CN); Jing Wang, Beijing (CN); Guoyuan Pan, Beijing (CN); Yang Zhang, Beijing (CN); Hao Yu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(*) Notice: Subject to any disclaimer, the term of this patent is extended or adjusted under 35 U.S.C. 154(b) by 664 days.

(21) Appl. No.: 17/755,535

(22) PCT Filed: Oct. 27, 2020

(86) PCT No.: PCT/CN2020/124164
§ 371 (c)(1),
(2) Date: Apr. 30, 2022

(87) PCT Pub. No.: WO2021/083162
PCT Pub. Date: May 6, 2021

(65) Prior Publication Data
US 2022/0379266 A1    Dec. 1, 2022

(30) Foreign Application Priority Data

| Nov. 1, 2019 | (CN) | 201911057104.5 |
| Dec. 12, 2019 | (CN) | 201911270854.0 |
| Apr. 28, 2020 | (CN) | 202010348806.5 |

(51) Int. Cl.
*B01D 69/02*    (2006.01)
*B01D 61/14*    (2006.01)
(Continued)

(52) U.S. Cl.
CPC ......... *B01D 69/02* (2013.01); *B01D 61/147* (2013.01); *B01D 67/0013* (2013.01);
(Continued)

(58) Field of Classification Search
None
See application file for complete search history.

(56) References Cited

U.S. PATENT DOCUMENTS

| 6,146,535 A | 11/2000 | Sutherland |
| 8,465,565 B2 | 6/2013 | Calis et al. |

(Continued)

FOREIGN PATENT DOCUMENTS

| CN | 101773789 A | 7/2010 |
| CN | 101890304 A | 11/2010 |

(Continued)

OTHER PUBLICATIONS

Hu, Ruiqing et al.; "Study on the crystalline and fundamental of the porous PLA membrane Fabricated via phase inversion by micro water droplets"; China Academic Journal Electronic Publishing House, vol. 1, No. 7, Jul. 15, 2017, ISSN: 1674-0246, Abstract, pp. 17-18 and 29-46.

(Continued)

*Primary Examiner* — Richard C Gurtowski
(74) *Attorney, Agent, or Firm* — NKL Law; Allen Xue

(57) ABSTRACT

A polymer film has a loofah-like structure. It has a fibrous framework structure formed by three-dimensional interwoven and interconnected polymer fibers and a three-dimensional interconnected network pore structure distributed in the fibrous framework structure. The polymer is an organic polymer and the fibrous framework structure is integrally formed by the polymer. The film has a volume porosity of from 50% to 95%. The film is obtained by means of a combination method for atomization pretreatment and non-solvent phase separation. The film can be used in the fields (Continued)

of gas filtration, liquid filtration, oil-water separation, adsorption materials, catalysis, pharmaceutical sustained release materials, anti-adhesion coatings, oil delivery and oil spill interception.

29 Claims, 10 Drawing Sheets

(51) Int. Cl.
  *B01D 67/00* (2006.01)
  *B01D 69/14* (2006.01)
  *B01D 71/02* (2006.01)
  *B01D 71/16* (2006.01)
  *B01D 71/28* (2006.01)
  *B01D 71/34* (2006.01)
  *B01D 71/38* (2006.01)
  *B01D 71/42* (2006.01)
  *B01D 71/68* (2006.01)
  *C02F 1/44* (2023.01)
  *C02F 101/32* (2006.01)

(52) U.S. Cl.
  CPC ......... *B01D 69/148* (2013.01); *B01D 71/027* (2013.01); *B01D 71/16* (2013.01); *B01D 71/281* (2022.08); *B01D 71/34* (2013.01); *B01D 71/381* (2022.08); *B01D 71/421* (2022.08); *B01D 71/68* (2013.01); *C02F 1/444* (2013.01); *B01D 2323/12* (2013.01); *B01D 2323/22* (2013.01); *B01D 2325/026* (2013.01); *B01D 2325/0281* (2022.08); *B01D 2325/02834* (2022.08); *B01D 2325/04* (2013.01); *B01D 2325/36* (2013.01); *C02F 2101/32* (2013.01)

(56) References Cited

U.S. PATENT DOCUMENTS

| | | | |
|---|---|---|---|
| 9,206,546 B2 | 12/2015 | Kato et al. | |
| 10,960,362 B2 | 3/2021 | Huang et al. | |
| 2010/0313753 A1 | 12/2010 | Calis et al. | |
| 2012/0132363 A1 | 5/2012 | Kato et al. | |
| 2013/0284667 A1* | 10/2013 | Pinnavaia | G06F 1/20 210/500.21 |
| 2016/0023148 A1 | 1/2016 | Ochiai et al. | |
| 2016/0122686 A1* | 5/2016 | Dietz | C11B 3/04 422/187 |
| 2016/0375410 A1* | 12/2016 | Berchtold | B01D 53/228 95/55 |
| 2017/0157567 A1* | 6/2017 | Livingston | B01D 69/12 |
| 2017/0266626 A1 | 9/2017 | Kayama et al. | |
| 2019/0262777 A1 | 8/2019 | Querzé et al. | |

FOREIGN PATENT DOCUMENTS

| | | |
|---|---|---|
| CN | 102015080 A | 4/2011 |
| CN | 107073411 A | 8/2017 |
| CN | 108310984 A | 7/2018 |
| CN | 109046034 A | 12/2018 |
| CN | 109316981 A | 2/2019 |
| CN | 109499393 A | 3/2019 |
| CN | 109713203 A | 5/2019 |
| CN | 109985529 A | 7/2019 |
| CN | 110280222 A | 9/2019 |
| CN | 106894165 B | 10/2019 |
| EA | 030909 B1 | 10/2018 |
| EP | 3530344 A1 | 8/2019 |
| EP | 4019121 A1 | 6/2022 |
| JP | 2011512252 A | 4/2011 |
| JP | 2012139619 A | 7/2012 |
| JP | 201513987 A | 1/2015 |
| JP | 2015128620 A | 7/2015 |
| JP | 2017538579 A | 12/2017 |
| RU | 2657059 C1 | 6/2018 |
| WO | 2010126117 A1 | 11/2010 |
| WO | 2019004388 A1 | 1/2019 |

OTHER PUBLICATIONS

Wu, Yinan et al.; "Fabrication and performances of environment functional materials with hierarchical structure", Tongji University Press, Aug. 31, 2017, vol. 1, pp. 50.

Yang, Hongjun et al.; "Formation Polymer Porous Membranes by Water Micro-Droplet-Induced Phase Inversion", Key Laboratory of Green Processing and Functional New Textile Materials of Ministry of Education, Oct. 16, 2014, pp. 507-508.

Song, Lixin et al.; "Novel structure of TiO2eZnO core shell rice grain for photoanode of dye-sensitized solar cells"; Journal of Power Sources; 2014, vol. 261, pp. 1-6.

Ge, Jianlong et al.; "Biomimetic and Superwettable Nanofibrous Skins for Highly Efficient Separation of Oil-in-Water Emulsions"; Advanced Functional Materials; 2018, 28, 1705051 pp. 1-10.

Ji, Xiaoyuan et al.; "Enabling multi-enzyme biocatalysis using coaxial-electrospun hollow nanofibers: redesign of artificial cells"; Journal of Material Chemistry B; 2014, 2, pp. 181-190.

Zhang, Wenbin et al.; "Salt-Induced Fabrication of Superhydrophilic and Underwater Superoleophobic PAA-g-PVDF Membranes for Effective Separation of Oil-in-Water Emulsions"; Angew. Chem. Int. Ed.; 2014, 53, pp. 856-860.

Chen, Fa-Ming et al.; "Advancing biomaterials of human origin for tissue engineering"; Progress in Polymer Science; vol. 53; Year: 2016; pp. 86&93.

Popova, O.V. et al.; "Membranes in chemical and electrochemical processes"; South Russian state technical university, 2005; pp. 1, 3-5.

Tan, Linli et al.; "Superhydrophilic and underwater superoleophobic poly (acrylonitrile-co-methyl acrylate) membrane for highly efficient separation of oil-in-water emulsions"; Journal of Membrane Science, vol. 564, Jul. 20, 2018; ISSN: 0376-7388; pp. 712-721.

Ju, Junping et al.; "Superhydrophilic and underwater superoleophobic PVDF membranes via plasma-induced surface PEGDA for effective separation of oil-in-water emulsions"; Colloids and Surfaces A: Physiochemical and Engineerings Aspects, vol. 481, Jan. 29, 2015; ISSN: 0927-7757; pp. 151-157.

Li, Hui et al.; "Facile preparation of superhydrophobic and superoleophilic porous polymer membranes for oil/water separation from a polyarylester polydimethylsiloxane block copolymer"; Journal of Material Science, Kluwer Academic Publishers, vol. 51, No. 6; Dec. 11, 2015; ISSN: 0022-2461; pp. 3211-3218.

Abdulla Almarzooqi, Faisal et al.; "Improving Liquid Entry Pressure of Polyvinylidene Fluoride (PVDF) Membbranes by Exploiting the Role of Fabrication Parameters in Vapor-Induced Phase Separation VIPS and Non-Solvent-Induced Phase Separation (NIPS) Processes"; Applied Sciences, vol. 7, No. 181; Feb. 14, 2017; pp. 1-15.

Chen, Xuemei et al.; "Continuous Oil-Water Separation Using Polydimethylsiloxane-Functionalized Melamine Sponge"; Industrial & Engineering Chemistry Research; vol. 55, No. 12; Mar. 18, 2016; ISSN: 0888-5885; pp. 3596-3602.

Chinyerenwa, Adindu Chisom et al.; "Structure and thermal properties of porous polylactic acid membranes prepared via phase inversion induced by hot water droplets"; Polymer; vol. 141; Apr. 1, 2018; ISSN: 0032-3861; pp. 62-29.

Hu, Ruiqing; "Study on the Crystalline and Fundamental of the Porous PLA Membrane Fabricated Via Phase Inversion by Micro Water Droplets"; Chinese Master's Theses Full-Text Database; Jun. 1, 2016; pp. 1-64.

\* cited by examiner

POLYMER-BASED FILM, PREPARATION METHOD THEREFOR, AND USE THEREOF

TECHNICAL FIELD

The present invention relates to the technical field of a membrane, a preparation method therefor and use thereof, particularly, to a polymer-based membrane with a loofah sponge-like structure, a preparation method therefor and use thereof, and a functional material comprising the membrane, in particular a filter membrane or a separation membrane.

BACKGROUND ART

Nanofibers in the nature, such as spider silk and silkworm silk, have received extensive attention for their excellent properties, but their industrialization has been limited due to the lack of natural resources. In order to realize the artificial preparation of nanofibers, researchers have been making explorations for many years. Among them, electrospinning technology has become one of main routes for effective preparation of nanofiber materials due to its advantages of simple manufacturing equipment, low spinning cost, a wide variety of spinnable substances, and controllable process.

Electrospinning is a process wherein under a strong electric field, the droplets formed by a polymer solution or melt at the needle tip will change from spherical to conical shape, and extend from the conical tip to obtain the fiber filaments, to thereby perform jet spinning, and at a receiving device, the spun filaments are solidified. In this way, polymer filaments of several nanometers to several micrometers in diameter can be produced. In recent years, due to their high specific surface area, high porosity and special physical and chemical properties, electrospun fibers have been widely used in environmental protection, health, energy and other fields, such as high-efficiency filter and separation membrane materials in environmental governance, membrane materials for energy storage and conversion in energy devices, tissue culture and wound dressing materials in the medical field, etc. Researchers endow nanofibers with different morphologies and functions mainly through the means such as material modification (CN109713203A), composite of multiple materials (J. Power Sources, 2014, 261, pages 1-6), and morphology control (Adv. Funct. Mater. 2018, 28, 1705051).

However, the preparation of nanofiber membranes by electrospinning technology still faces some problems to be solved. Although electrospinning devices of various industrial scales with different types of spinning/collecting accessories have been devised, the yields are often too low. In the current state of the art, the spinning efficiency is low, with a maximum of several grams per hour for each needle, and the yield of one device limited to dozens of kilograms per day, so that the application of final products is mostly in the laboratory stage only. In addition, high-voltage electricity brings operational risks to workers; and in the process of solution electrospinning, the solvent usually accounts for 70-90 wt % of the solution, and the evaporation of the solvent into the environment will bring about environmental burden and safety problems, and waste the chemicals; when a flammable organic solvent is used, the organic solvent readily volatizes and will generate a large amount of flammable gas, resulting in fire hazards and environmental risks. Therefore, it is particularly important to design a high-yield spun nanofiber separation membrane using an environmentally friendly technology. In addition, the nanofiber membrane prepared by the electrospinning method is present in the form of non-woven fabric, with its microstructure shown in the electron microscope photograph in FIG. 9 (from J. Mater. Chem. B 2014, 2, 181-190), the fibers inside the membrane are generally in a state of overlapping with each other in layers, and the fibers of the various layers are not firmly fixed together. When it is applied to occasions in need of withstanding large impact forces such as liquid filtration, its structural stability is insufficient.

On the other hand, the demand for water resources in modern society is increasing, but the population and economic development ever since the industrial revolution has inevitably produced a large amount of waste water, especially oily waste water, which needs to be properly treated for recycling. Membrane water treatment technology is widely used in water treatment process due to its simple process, low cost, energy saving and high efficiency, especially for the separation of oil-water mixture.

The most difficult to separate in oily wastewater is the emulsified oil. The oil droplets have particle diameter mainly between 0.1 and 2 µm, usually less than 10 µm, and are stably dispersed in water in the oil-in-water form. For the treatment of such oily sewage, the study on the superhydrophilic and superoleophobic separation membrane materials has received extensive attention.

Microfiltration membranes occupy a place in the field of membrane separation due to their small pore size and relatively low cost of use. Microfiltration membranes mainly rely on mechanical sieving to allow macromolecules and soluble solids to penetrate, but intercept the substances such as larger-size suspended matters, bacteria, and high-molecular-weight colloids.

For liquid separation membranes, mostly, there is the irreversible pollution problem during the separation process. Therefore, it is necessary to develop a separation membrane with a suitable surface microstructure while ensuring permeability, so as to reduce the adhesion of pollutants to the membrane surface to thereby improve its service life. For example, in the oil-water separation process, usually the solid-oil-water three phases contact, and in order that the oil droplets do not stick on the surface and readily roll, it is ideal to build a rough micro-nano structure surface with discontinuous three-phase contact lines. The current reports on the construction of micro-nano structure separation membranes include the preparation of the salt-induced phase separation PAA-g-PVDF membrane (Angew. Chem. Int. Ed. 2014, 53, 856-860), which is used for the effective separation of oil-water emulsions, but has high raw material costs and brings a large amount of high-salinity wastewater. In addition, for example, CN109316981A reported that hyperbranched polyether was grafted to the surface of a hydrophilically modified membrane, and its numerous long branches could go deep into the oil-water interface of the emulsion to destroy the strength of the emulsion interface membrane to thereby achieve the effect of demulsification separation. In CN109046034A, polyvinylidene fluoride was modified by polydopamine/silica powder to obtain a hydrophilic/oleophobic vinylidene fluoride separation membrane. The literature Adv. Funct. Mater. 2018, 28, 1705051 reported that the surface of lotus leaf-like structure was constructed by the combination of electrospinning and electrostatic spraying, the prepared separation membrane had a high porosity, the mastoid structures similar to lotus leaf surface were distributed on the membrane surface, and the membrane exhibited high separation efficiency for O/W (oil-in-water) emulsions while resisting contamination. In addition, there are organic-inorganic hybrid metal mesh membrane (CN110280222A), chemical grafting on membrane surface (CN109499393A) and other methods.

However, most of the existing methods for preparing separation membranes with a micro-nano composite structure have the disadvantages that the material cost and process cost are high, process operation is cumbersome, continuous preparation cannot be achieved, industrialization is difficult, and the micro-nano rough structure on the membrane surface cannot be maintained for a long time, or the separation application range of the membrane is narrow.

In addition, in the conventional vapor-induced phase separation (VIPS) method for membrane preparation, the non-solvent is introduced into the polymer solution from the gas phase. In this case, the precipitation is very slow. Due to the slow introduction of the non-solvent, there is no membrane-forming liquid concentration gradient in the membrane thickness direction. The membrane-forming liquid precipitates almost simultaneously along the thickness direction of the entire film. However, since the membrane-making process of the VIPS method is very slow, the membrane-making time is usually several hours, and the efficiency is low, it is difficult to achieve industrial continuous production and not suitable for the preparation of practical separation membranes or filter membranes, especially porous membranes cannot be prepared when porous materials such as non-woven fabrics are used as the support layer.

Therefore, there is a need for an improved membrane suitable for separation or filtration, which has an improved overall performance and can be prepared efficiently with raw materials of lower price, at low cost, and by a simple process.

DISCLOSURE OF THE INVENTION

In view of the above problems in the prior art, the object of the present invention is to provide a membrane with a highly penetrating-through pore (hole) structure and a three-dimensional fiber network structure, which has a good separation or filtration effect, is particularly suitable for use as a microfiltration membrane for oil-water separation and has a high structural stability.

In particular, it is also an object of the present invention to provide a membrane having a special surface microstructure, which has a special wettability, thereby improving the fouling resistance of the membrane.

Another object of the present invention is to provide a method for preparing the membrane, which method is efficient, low in cost, and simple in preparation process, and wherein the membrane can be prepared based on general-purpose polymers, thus the raw material price is low.

According to the present invention, it has been unexpectedly found that by the method of combining atomization pretreatment with non-solvent induced phase separation (NIPS, also known as non-solvent phase inversion), an organic polymer-based membrane having a loofah sponge-like structure is prepared with high efficiency, the loofah sponge-like structure comprises a fiber skeletal structure formed by three-dimensionally interwoven and interconnected polymer fibers, and a three-dimensionally interpenetrating network pore structure distributed in the fiber skeletal structure, and particularly in the case of using at least two polymers, a micro-nano composite structure with nano-scale protrusions on the fiber skeleton is obtained, thereby achieving the objects.

The pores of the surface of the membrane according to the present invention and of the penetrating open-pore structure in the internal structure of the fiber skeleton constitute the gaps similar to those among the overlapping fibers in the nanofiber membrane structure prepared by electrospinning, which can achieve a similar or better effect in separation, filtration, adsorption and the like. Nevertheless, the membrane of the present invention differs from the nanofiber membrane obtained by electrospinning in that the polymer of the membrane of the present invention shows a three-dimensional fiber network structure, and the polymer fibers are directly three-dimensionally interconnected, i.e., show radial connections in three-dimensional space, rather than overlapping connections. The connections among the polymer fibers of the membrane of the present invention are firm, thereby improving the structural stability and strength of the membrane.

Membrane

Thus according to a first aspect, the present invention provides a polymer-based membrane having a loofah-sponge like structure comprising a fiber skeletal structure formed by three-dimensionally interwoven and interconnected polymer fibers and a three-dimensionally interpenetrating network pore structure distributed in the fiber skeletal structure, wherein the polymer is an organic polymer and the fiber skeletal structure is integrally formed from the polymer, and the volume porosity of the membrane is 50%-95%. This is a membrane having a highly penetrating-through bicontinuous network pore structure.

The "membrane" mentioned herein refers to a functional material having a film-like structure, such as a separation membrane, a filter membrane, and the like.

As used herein, "loofah sponge-like structure" refers to a structure similar to a loofah sponge structure, which comprises a fiber skeletal structure formed by three-dimensionally interwoven and interconnected polymer fibers, and a three-dimensionally interpenetrating network pore structure distributed in the fiber skeletal structure, as is shown, for example, in FIGS. 1 to 6. The loofah sponge structure is shown in FIG. 10, which is a photograph of the loofah sponge. It can be seen that the internal fiber layer of the loofah sponge structure is of a three-dimensional stereo-structure rather than a laminated structure, that is, the connection points between the same fiber layer and various longitudinal fibers are not in the same plane. The polymer fibers of the membrane of the present invention are three-dimensionally interconnected to form a firmly interconnected three-dimensional network structure similar to the loofah sponge structure shown in FIG. 10, i.e., the loofah sponge-like structure as defined above, in which structure the internal fiber layer is also of a three-dimensional stereo-structure, instead of a laminated structure, that is, connection points between the same fiber layer and various longitudinal fibers are not in the same plane, wherein the pores among the fibers constitute the through-pore structure of the polymer membrane described above. The membrane having such a loofah sponge-like structure according to the present invention has a highly penetrating-through network pore structure, high porosity and high specific surface area, as well as a good structural stability.

As used herein, "three-dimensionally interwoven" means that polymer fibers are distributed in a staggered manner inside and between the fiber layers at different thicknesses, and are not parallel to each other; and the connecting fibers (also referred to as longitudinal fibers) between the various fiber layers are not parallel to each other, the connection points between the same fiber layer and the various longitudinal fibers are not in the same plane, so that the fiber skeletal structure has an irregular shape, and a network pore structure is formed among the fibers, wherein the connection points of the fibers constituting each pore are not in the same plane or inside the same fiber layer.

As used herein, "three-dimensionally interconnected" means that the polymer fibers are interconnected in the surface direction of the membrane, and are connected up and down from the surface of the membrane to the interior thereof, in other words, the polymer fibers are connected radially in three-dimensional space.

As used herein, "three-dimensionally interpenetrating" means that the pore structure of the membrane penetrates up and down from the surface of the membrane to the interior thereof, and penetrates in plane in a direction parallel to the surface of the membrane inside the membrane.

In the membrane of the present invention, the fiber skeletal structure is integrally formed from the polymer. The polymer fibers are directly connected as a whole, and such a membrane is formed from the polymer at one time during the manufacturing process.

In the fiber skeletal structure of the membrane according to the present invention, the average distance between two adjacent connection points in the thickness direction may be smaller than the average distance between two adjacent connection points in the surface direction.

In the cross-section of the membrane according to the invention, substantially the same type of pores can be distributed along the thickness direction of the membrane. As is well known in the art, the types of pores of membrane mainly include network pores, sponge-like pores, finger-like pores and the like. Different types of pore structures often appear simultaneously on the cross-section of the microfiltration membrane or ultrafiltration membrane obtained by the traditional non-solvent induced phase separation method, for example, there is the sponge-like pore structure close to the surface layer of the membrane, and there is large finger-like pore structure close to the middle part and bottom part of the membrane. The cross-section of the membrane of the present invention has network pores distributed along the thickness direction of the membrane and has substantially no other types of pores, such as sponge-like pores and/or finger-like pores. The membrane of the present invention preferably has only network pores distributed from the surface to the interior. The cross-section of the membrane of the present invention can be a structure formed by the polymer fiber skeletal structure and pores with a substantially consistent morphology along the thickness direction of the membrane, that is, on the cross-section of the membrane, the polymer fiber skeletal structure and substantially the same type of pores can be distributed along the thickness direction of the membrane, in other words, the pores distributed on the entire cross-section of the membrane are substantially of the same type, and there is no such phenomenon that the membrane surface layer and the membrane bottom layer have different types of pores. "Substantially the same type" means that there may be inevitably a small number of different types of or imperfect pore structures in the cross-section of the membrane due to the process, but the cross-section of the membrane as a whole is distributed with the same type of pores, i.e., network pores.

Herein, the microfiltration membrane generally refers to a filter membrane with an average pore size of 0.1-10 μm, and the ultrafiltration membrane generally refers to a filter membrane with an average pore size of 10-100 nm.

The cross-sectional diameter of a single polymer fiber between two connection points in the fiber skeletal structure of the membrane according to the present invention may be less than or equal to 2 μm, and may vary irregularly. The diameter of the cross-section of the fiber is determined by scanning electron microscopy (SEM).

As used herein, the "single polymer fiber" refers to a single fiber-like part between two connection points in the fiber skeletal structure. The so-called fiber-like part refers to the part distributed in the form of a thread in the membrane skeleton.

The length of a single polymer fiber between two connection points in the fiber skeletal structure of the membrane according to the present invention can be less than 10 μm, as measured by SEM, and characterized by the linear distance between the starting point and the ending point of the fiber-like part between two connection points in the fiber skeletal structure in the SEM photograph indicated in FIG. 5. The length of such a single polymer fiber is significantly shorter than the length (at least on the centimeter scale) of a single polymer fiber in a nanofiber membrane prepared by the electrospinning method, thereby resulting in a fiber skeletal structure according to the present invention that is significantly different from the fiber structure obtained by the electrospinning method.

The membrane according to the present invention may have an average pore size of from 0.01 to 5 μm, preferably from 0.1 to 3 μm, more preferably from 10 nm to 3 μm. The average pore size of the membrane is measured by a gas permeation method, for example, using a pore size analyzer.

The membrane of the present invention has a highly penetrating-through network pore structure and has high porosity. The volume porosity of the membrane of the present invention can reach 50% to 95%, preferably 65% to 95%, more preferably 80% to 95%. The volume porosity of the membrane is determined by a gravimetric method.

In a preferred embodiment, the polymer fibers of the membrane of the present invention may have a cavity structure inside them, thereby further increasing the porosity, specific surface area and improving adsorption property.

The membrane according to the present invention is based on a polymer and is mainly made of a polymer. The polymer is an organic polymer, including but not limited to any general-purpose polymers suitable for membrane preparation or their modified polymers, preferably can be selected from any polymers suitable for membrane formation by non-solvent induced phase separation method. The polymer may for example be at least one selected from the group consisting of polyvinylidene fluoride, polysulfone, polyethersulfone, polyacrylonitrile, polyacrylic acid, polylactic acid, polyamide, chitosan, polyimide, modified cellulose (e.g., cellulose acetate), polystyrene, polyolefin, polyester, polychlorotrifluoroethylene, polyvinyl chloride, polyvinyl alcohol, polyvinylpyrrolidone, polyethylene glycol, modified starch, polyvinylamine hydrochloride, polyethyleneimine, poly-N-isopropylacrylamide and their modified polymers (e.g., polyvinylidene fluoride modified by acrylic acid grafting, sulfonated polysulfone, maleic anhydride-grafted polysulfone, sulfonated polyethersulfone, and acrylic acid-grafted polyacrylonitrile).

The polymers can be hydrophilic polymers or lipophilic polymers so as to prepare membranes with different wettability, such as hydrophilic membranes or hydrophobic membranes.

The hydrophilic polymer can be selected from polymers which per se have a certain degree of hydrophilicity, including but not limited to one or more of sulfonated polyethersulfone, polylactic acid, polyester, chitin, cross-linked polyvinyl alcohol, modified cellulose, modified starch, polyethylene glycol, chitosan, polyacrylonitrile, polyvinylamine hydrochloride, polyacrylic acid, polymer hydrogel (such as poly-N-isopropylacrylamide hydrogel), cellulose acetate, polyethyleneimine, polyamide, polyimide and the like; or can be a polymer modified by hydrophilic group grafting or a block copolymer containing a hydrophilic group, for example, including one or more of copolymers or branched polymers obtained by graft modification with hydrophilic segments such as acrylic acid, maleic anhydride, polyethylene glycol and sulfonic acid group, or obtained by block copolymerization thereof, for example, polyvinylidene fluoride modified by acrylic acid grafting, sulfonated polysulfone, sulfonated polyether sulfone, maleic anhydride-grafted polysulfone, acrylic acid-grafted polyacrylonitrile and the like. Preferably, it can be at least one selected from the group consisting of sulfonated polyethersulfone, polyacrylonitrile, polyacrylic acid, polylactic acid, polyamide, chitosan, polyimide, polyester, chitin, cellulose acetate and the like.

The hydrophobic polymer may be at least one selected from the group consisting of polyvinylidene fluoride, polysulfone, polyethersulfone, polyolefin, polychlorotrifluoroethylene, polyvinyl chloride, polystyrene, and the like.

The molecular weight of the polymer is not particularly limited, as long as it is suitable for membrane formation, particularly, by non-solvent induced phase separation method, to form a three-dimensional fiber skeletal structure.

In one embodiment, the surface of the membrane of the present invention may have micro/sub-micron sized recess structures, with loofah sponge-like structures distributed on or around or among the recess structures. The recess structure can increase the contact area between the liquid and the loofah sponge-like structure or the network pore structure, and can further increase the roughness of the membrane surface, thereby further improving the separation or filtration efficiency of the membrane.

The recess structure may have a size of 0.5 to 10 μm, as determined by SEM, and characterized by the diameter of the opening of the recess on the membrane surface in the SEM photograph. The size of the recess is significantly larger than the size of the pores in the loofah sponge-like structure or the average pore size of the membrane. In this embodiment, the average pore size of the membrane is preferably 10 nm to 3 μm. Such a membrane with recess structures is preferably made of a hydrophilic polymer as the matrix.

The membrane according to the present invention may additionally comprise additives commonly used in membrane preparation, for example, various inorganic nanoparticles, such as nanoscale inorganic fillers, such as $MnO_2$, $SiO_2$, ZnO, and the like. It may also comprise inorganic salt porogens remaining in the membrane preparation process, such as LiCl, $ZnCl_2$, $MgCl_2$, LiBr, etc.

The membrane may also be present on a support layer, e.g., on a fabric, preferably a nonwoven fabric.

The membrane of the present invention has a microstructure similar to loofah sponge, wherein the densely distributed three-dimensional network through-pore structure significantly increases the surface roughness (Ra) of the porous membrane, wherein Ra can reach 1 to 10 μm, as determined by non-contact optical profile analysis method. The increase in surface roughness can improve the wettability of the membrane surface, making the hydrophilic surface more hydrophilic and the hydrophobic surface more hydrophobic; and the increase in wettability is beneficial to improve the selective separation function of the membrane. Based on the synergistic effect of the pore structure and surface/interface wettability, the obtained hydrophilic membrane exhibits a strong hydrophilicity and underwater oleophobicity, and has an excellent oil-water separation efficiency, wherein after the membrane surface is in contact with water, a highly stable hydration protective layer can be formed on the surface of the membrane, so as to have the effect of inhibiting the adherence of oil droplets under water, and this effect can be further enhanced when the surface of the membrane has a recess structure; in addition, the obtained hydrophobic membrane exhibits a strong hydrophobicity and lipophilicity. This special wettability allows the membrane according to the present invention to be effectively used in the fields of separation, filtration, adsorption and the like. The membrane according to the present invention exhibits excellent properties such as high flux, high retention rate, self-cleaning, low adherence, high adsorption rate, etc., for example, when used as a separation membrane, for an O/W type emulsified oil having an average oil droplet size of 300 nm to 3 μm, the oil-water separation efficiency can reach above 99%. In addition, since the polymer fibers are three-dimensionally connected to form a firm fiber skeletal structure, the structure and properties of the membrane of the present invention are stable, and the phenomenon of fiber slippage during the use of the electrospinning membrane will not occur.

Membrane with Micro-Nano Composite Network Structure

In one embodiment, nano-scale protrusions can be distributed on the fiber skeletal structure of the membrane, thereby forming a micro-nano composite network structure, which thus realizes special wettability, thereby improving the fouling resistance of the membrane.

The protrusions are integrally formed with the fiber skeleton. The size of the protrusions may be in the range from 20 to 400 nm, as determined by SEM. The protrusions are generally in the shape of particles, and accordingly, the size of the protrusions refers to the average particle diameter of the particles.

In such an embodiment, the average pore size of the membrane may be in the range from 0.1 to 5 μm.

The micro-nano composite network structure or micro-nano structure according to the present invention refers to a structure comprising a micro-scale network skeleton and nano-scale protruding small particles on the skeleton. The presence of such a micro-nano structure enables the membrane to have a special wettability of hydrophilicity in air/superoleophobicity under water and have an extremely low adhesion to oil. The sieving channels formed during the construction of the rough surface of the membrane also endow the membrane with oil-water separation property. The micro-nano structure on the surface enables the surface of the membrane to form a highly stable hydration protective layer after contact with water, which layer blocks the contact between oil droplets and the membrane, thereby achieving the effect of inhibiting the adherence of oil droplets under water. In addition, the network skeleton of the membrane is of a micro-nano composite structure, so that the solid-water-oil three-phase contact line is discontinuous in water, thus oil will not adhere to the membrane while the membrane is superoleophobic in water.

In such an embodiment, the membrane typically comprises a mixture of at least two polymers. Useful polymer types are described above. Preferably, the at least two polymers are hydrophilic polymers that are soluble or miscible in the same good solvent.

Preferably, the first polymer may include, but is not limited to: at least one of polyvinyl chloride, polysulfone, polyethersulfone, sulfonated polyethersulfone, polyacrylonitrile, cellulose acetate, polyvinylidene fluoride, polyimide, acrylonitrile-styrene copolymers (AS resin) and their modified polymers. The second polymer can be dissolved in a good solvent of the first polymer or miscible with the first polymer, and can include but is not limited to: at least one of chitosan, polyvinyl alcohol, polyvinylpyrrolidone, polyethylene glycol and polyoxyethylene polyoxypropylene ether block copolymer.

The weight ratio of the first polymer to the second polymer may be 1:(0.01 to 5), preferably 1:(0.1 to 3).

The membrane with the micro-nano composite network structure prepared by at least two hydrophilic polymers can achieve both super-hydrophilicity and super-lipophilicity in air, preferably the contact angle to water and that to oil in air are both smaller than 10°, more preferably smaller than 5°, and the contact angle to oil under water may be greater than 135°, preferably greater than 150°.

The membrane with the micro-nano composite network structure prepared by at least two hydrophobic polymers can achieve superhydrophobicity in air, preferably the contact angle to water in air is greater than 130°, more preferably greater than 150°, and the contact angle to oil under water may be smaller than 10°, preferably smaller than 5°.

Preparation Method

According to a second aspect of the present invention, the present invention provides a method for preparing a membrane according to the present invention, comprising the step of: subjecting a membrane casting solution comprising the polymer to a non-solvent induced phase separation process in combination with an atomization pretreatment to prepare the membrane.

Specifically, the method may comprise the following steps:
1) dissolving the polymer in a solvent to formulate a polymer solution as the membrane casting solution;
2) applying the polymer solution in the form of a film, for example, blade-coating it into a film, followed by an atomization pretreatment, wherein the atomization pretreatment is staying in an atomized droplet bath; and
3) immersing the product obtained in step 2) in a solidification bath to obtain the membrane.

In said step 1), the concentration of the polymer solution may be in the range of from 5 to 25 wt %, preferably from 6 to 20 wt %. The formulated polymer solution is used as the membrane casting solution.

The types of polymer used are as described above.

The solvent can be selected from the good solvents that can dissolve the polymer, including but not limited to one or more of N,N-dimethylformamide, N-methylpyrrolidone, N,N-dimethylacetamide, dimethyl sulfoxide, tetrahydrofuran, dioxane, acetonitrile ($CH_3CN$), acetone, chloroform, toluene, benzene, hexane and octane.

As use herein, the "good solvent" refers to a solvent with a strong dissolving ability for the polymer solute, and an interaction parameter $\chi$ with the polymer solute of less than 0.5.

As use herein, the "poor solvent" refers to a solvent with a weak dissolving ability for the polymer solute, and an interaction parameter $\chi$ with the polymer solute of close to or greater than 0.5.

The polymer solution or membrane casting solution may also comprise common additives suitable for preparing membranes, for example, inorganic salt porogens and/or various inorganic nanoparticles such as nano-scale inorganic fillers, and the amount thereof may be conventional, or may be adjusted according to the actual situation. The additive may be dissolved or dispersed in the polymer solution or membrane casting solution. Commonly used inorganic salt porogens are, for example, LiCl, $ZnCl_2$, $MgCl_2$, LiBr and the like. Inorganic fillers are, for example, $MnO_2$, $SiO_2$, ZnO and the like. The polymer solution or membrane casting solution may also comprise a poor solvent for the polymer, including but not limited to: water, various small-molecule alcohols and the like.

Preferably, the polymer solution or membrane casting solution can be defoamed after formulation.

In step 2), the polymer solution can be uniformly coated on a support layer or a base material to thereby be applied in the form of a film.

The support layer or base material can be any support layer material or base material suitable for applying or coating the polymer solution, including but not limited to: porous support materials, such as fabrics, including non-woven fabrics, woven fabrics, etc.; and smooth base materials such as glass plates, plastic films, etc. In the case of using a support layer, the finished membrane of the present invention may end up on the support layer, in which case the method of the present invention may also be operated continuously, e.g., in a roll-to-roll continuous process. In the case of using a base material, the finished membrane of the present invention can eventually be released from the base material to become a self-supporting membrane.

The process of applying the film can be carried out by a common film application method, for example, by a casting method, wherein a doctor blade is used to blade-coating a film. Herein, the thickness of the film as applied is not particularly limited, and may be in the range of from 50 to 500 μm, preferably from 75 to 300 μm. Depending on the difference in the type of the polymer and the thickness of the blade-coated film, the dry membrane finally prepared may have a thickness of from several micrometers to hundreds of micrometers, preferably from 5 to 60 micrometers, more preferably from more than 10 micrometers to 60 micrometers.

In step 2), the atomization pretreatment is a process wherein after being applied or coated, the polymer solution is allowed to stay in and contact with the atomized droplet bath for a certain period of time. The atomization pretreatment time can be 1 s to 20 min, preferably 5 s to 3 min, more preferably 5 to 60 s, more preferably 5 to 50 s.

Herein, the method for obtaining the atomized droplet bath is not particularly limited, and various conventional liquid atomization methods can be used, such as pressure atomization, rotary disk atomization, high-pressure airflow atomization, sonic atomization (especially ultrasonic wave atomization) and the like. Atomization of a liquid can be achieved using conventional atomization equipment to obtain an atomized droplet bath. The size (particle diameter) of the droplets in the droplet bath may be 1 to 50 μm, more preferably 5 to 18 μm.

The droplets in the droplet bath comprise a poor solvent for the polymer, which can be a single-component solvent such as water (such as deionized water), ethanol and ethylene glycol, or a mixed solvent containing water, such as a mixed solvent composed of water and a polar aprotic solvent or other solvent, or a solution containing a salt, an acid, a base and the like.

The ambient humidity condition during the atomization pretreatment operation can affect the exchange rate between the solvent and the non-solvent, and thus affect the microstructure of the membrane. The humidity of the droplet bath can be of a relatively low humidity condition of less than 40%, or of a relatively high humidity condition of greater than or equal to 40%.

At room temperature (about 25° C.), under the ambient condition of a relatively low humidity of less than 40%, the surface of membranes prepared by polymers, especially hydrophilic polymers, may have micro/submicron sized recess structures. Under the ambient condition of a relatively high humidity of greater than or equal to 40%, the surface of the prepared membranes will form a uniform filamentary network structure without obvious recess structures.

The solidification bath used for subjecting the membrane to the NIPS phase inversion method in step 3) comprises a poor solvent for the polymer. The solvent can be the same as or different from the solvent contained in the droplets of the droplet bath, and can be a single-component solvent such as water, ethanol and ethylene glycol, or a mixed solvent containing water, such as a mixed solvent composed of water and a polar aprotic solvent or other solvent, or a solution containing a base, such as an aqueous sodium hydroxide solution.

In order to prepare a membrane with a micro-nano composite network structure, in step 1), at least two polymers used for preparing the membrane, i.e., at least a first polymer and a second polymer, can be dissolved in a solvent to formulate a polymer solution as the membrane casting solution. The total concentration of the first polymer and the second polymer in the polymer solution may be 6 to 30 wt %, preferably 10 to 25 wt %.

The type and weight ratio of the first polymer and second polymer are as described above.

In such an embodiment, the solvent can be a good solvent that can dissolve the first polymer and the second polymer, including but not limited to, at least one of N,N-dimethylformamide, N,N-dimethylacetamide, acetone, N-methyl-2-pyrrolidone, dimethyl sulfoxide, tetramethyl sulfoxide, tetrahydrofuran, dioxane, acetonitrile, chloroform and the like.

In such an embodiment, in step 2), the droplets in the atomization pretreatment may particularly comprise a poor solvent for the first polymer, which can be a single-component solvent such as water, ethanol and ethylene glycol, or a mixed solvent containing water, such as a mixed solvent composed of water and a polar aprotic solvent or other solvent, or a solution containing a salt, an acid or a base.

In such an embodiment, the solidification bath in step 3) may particularly comprise a poor solvent for the first polymer, which can be a single-component solvent such as water, ethanol and ethylene glycol, or a mixed solvent containing water, e.g., a mixed solvent composed of water and a polar aprotic solvent or other solvent, or a solution containing a base, e.g., an aqueous sodium hydroxide solution.

Due to the differences between the first polymer and the second polymer in solubility and wettability, there is a difference in the phase separation speed during the non-solvent induced phase separation, thereby forming a composite structure comprising a skeleton and nano protruding structures, wherein the nano protruding structures can improve the membrane properties, e.g., increasing roughness of the membrane, thereby improving wettability.

The key technology for preparing the membrane in the present invention is the combination of atomization pretreatment and non-solvent induced phase separation (NIPS) method. It is the present invention that for the first time adds an atomization pretreatment step before the traditional non-solvent induced phase separation method.

The atomization pretreatment method of the present invention is very different from the vapor-induced phase separation (VIPS) in the general sense, which means that the phase separation occurs under a certain high humidity (or saturated humidity) condition and does not involve an atomized droplet bath.

The formation of a polymer membrane is a complicated non-equilibrium process. The occurrence time, the type and the occurrence extent of phase separation depend on the kinetic factor of the phase separation process. The mass transfer and exchange between the non-solvent and the solvent is one of the critical factors to change the final membrane structure and properties. The atomization pretreatment means adopted in the present invention can make the membrane casting solution undergo partial phase separation uniformly from the surface layer to the bottom layer by controlling the entry of the non-solvent atomized small droplets into the membrane casting solution, thereby achieving an effect of no obvious concentration gradient of the membrane casting solution in the membrane thickness direction, similar to that obtained by the traditional VIPS method, in a short period of time, and then by the traditional non-solvent phase inversion method, further complete phase separation and complete solidification of the membrane structure are achieved. Since in the method of the present invention, the constitution of the non-solvent in the membrane casting solution changes gradually, the membrane structure prepared by the atomization pretreatment process is substantially uniform in the thickness direction, that is, the surface layer structure is substantially the same as the bottom layer structure. Thus, the cross-section of the obtained polymer membrane has a structure of polymer fiber skeleton and pores with substantially uniform morphology in the thickness direction of the membrane.

The preparation method according to the present invention is simple, efficient, low in production cost and easy to be industrialized, can achieve continuous production, does not require high-pressure operation, and is environmentally friendly, safe and energy saying. The membrane can be prepared based on general-purpose polymers, thus the raw material is cheap and readily available, and said membrane is easily prepared in a large-scale, suitable for industrial application, and can also achieve continuous production.

In the method according to the present invention, the chemical composition and microstructure of the membrane surface can also be adjusted by adjusting the formulation of the membrane casting solution, the atomization pretreatment process and the NIPS process parameters, thereby the surface wettability is adjusted to achieve different performances such as separation or filtration.

Use and Functional Materials

According to a third aspect of the present invention, the present invention provides use of the membrane according to the present invention for gas filtration, liquid filtration, oil-water separation, adsorption materials, catalysis, pharmaceutical sustained release materials, anti-adhesion coatings, oil delivery or oil spill interception and other fields.

The membrane according to the present invention has the characters similar to those of an electrospinning nanofiber membrane in terms of skeleton structure, and is characterized in terms of properties by a special wettability (superhydrophilicity, underwater superoleophobicity), ultralow oil adherence, high specific surface area and the like, and it is environmentally friendly, has a good stability, has the properties of being resistant against oil, organic matter, biomass, bacteria, microorganism and other pollutions, is easy to wash and clean, has a good recycling property, and can replace part of the application market of the existing electrospinning nanofiber membranes, for example, applications such as liquid and gas filtration, catalysis, and adsorption in the environmental field; wound dressings in the bioengineering field; battery separator materials in the energy field, etc.

Compared with the electrospinning membrane-making technology, the present invention is characterized in that: the present invention only needs to add an atomization pretreatment process before the existing non-solvent induced phase separation process commonly used in the industry, to obtain the membrane of the present invention; it can achieve a production efficiency as high as several meters per minute, and thus is easy for industrial application. In addition, the cross-sectional structure of the membrane of the present invention is similar to that of the nanofiber membrane, that is, the pores of the penetrating open-pore structure in the membrane structure of the present invention constitute the gaps similar to those among the fibers that overlap each other in the nanofiber membrane structure prepared by electrospinning, while at the same time, the membrane forming process of the non-solvent phase inversion method makes the polymer form a polymer-rich phase when isolated from the non-solvent and three-dimensionally interconnected into an integrity, thus the polymer fibers will connect to each other to form a firm three-dimensional network structure, to thereby have a good structural stability, so that the simulated nanofiber structure membrane of the present invention is more suitable for the liquid filtration occasions that need to withstand a certain impact force than an ordinary nanofiber membrane.

The membrane according to the present invention, particularly the membrane with micron/submicron sized recess structures on the surface or the membrane with a micro-nano composite network structure, has the ability to remove emulsified oil droplets without the need for a demulsifying process, thereby achieving the effect of oil-water separation. It has a fast and efficient separation performance for mixtures of dichloroethane, n-hexane, petroleum ether, toluene, animal and vegetable oils, gasoline, diesel, heavy oil, crude oil and the like with water, and can be used in oil-water separation, marine oil leakage treatment, oil spill interception, anti-adhesion coating, oil delivery and other fields. Hydrophilic membranes can be used to filter O/W emulsions, and hydrophobic membranes can be used to filter W/O emulsions.

The membrane with a micro-nano composite structure according to the present invention has a special micro-nano structure so that under water the solid-oil-water three-phase contact line is discontinuous, to thereby achieve the oil adherence-resistant effect while separating the oil, and it is not easy to be polluted, and has a good recycling property.

Correspondingly, according to a fourth aspect of the present invention, the present invention provides a functional material comprising the membrane of the present invention for use in gas filtration, liquid filtration, oil-water separation, adsorption materials, catalysis, pharmaceutical sustained release materials, anti-adhesion coatings, oil delivery or oil spill interception and other fields. The functional material is especially a separation membrane, preferably an oil-water separation membrane; or a filter membrane, preferably a microfiltration membrane.

EXAMPLES

Figure 1:
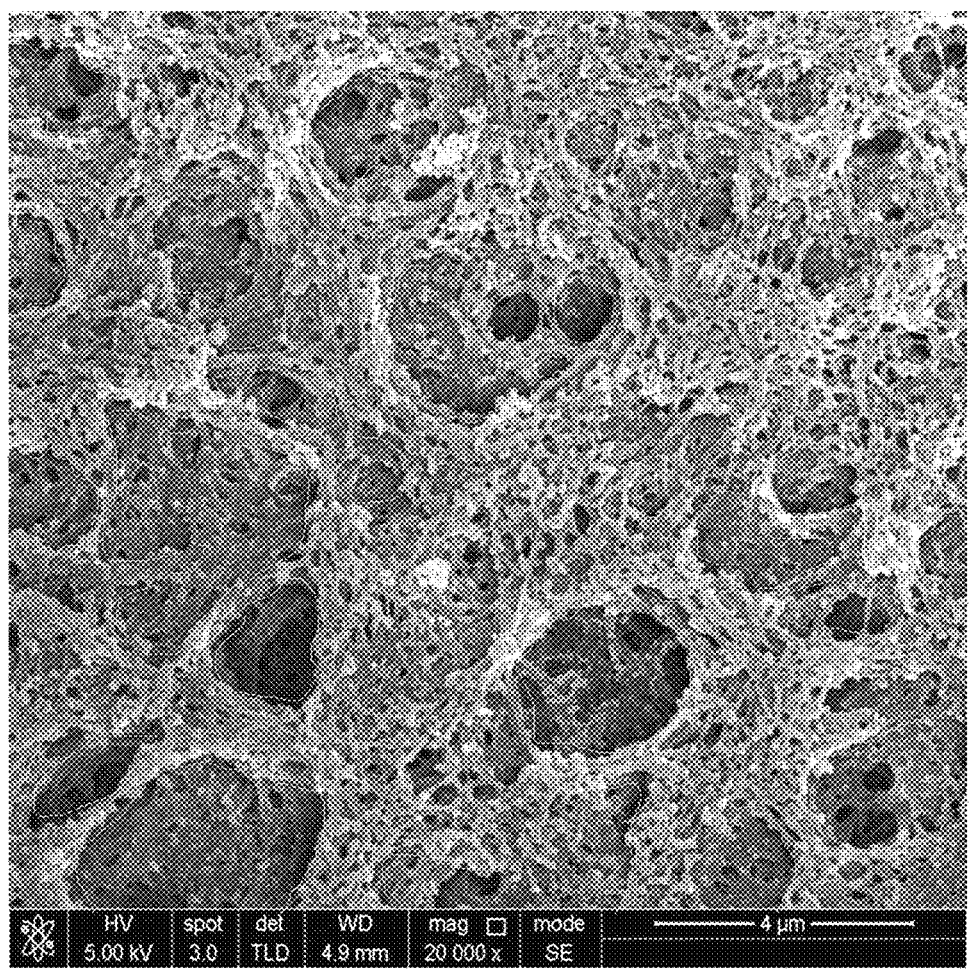
FIG. 1 is a surface morphological image of the polymer membrane of Example 1.

In the following, the present invention is further illustrated with reference to the examples. Nevertheless, the scope of the present invention is not limited by these examples, but is set forth in the appended claims.

1. Measurement Methods

1) Surface morphology and cross-sectional morphology of the membrane: The surface morphology and cross-sectional morphology of the membrane were observed using a high-resolution field emission scanning electron microscope (FESEM) of Model S-4800 from Hitachi, Japan, wherein the sample for the characterization of the cross-sectional morphology of the membrane was prepared by the liquid nitrogen freezing brittle facture method.

2) Average pore size of the membrane: The average pore size of the membrane was determined by a gas permeation method, using the instrument PSDA-20 microfiltration membrane pore size analyzer. When testing, the sample, with its rough surface upward, was loaded into a test module; before testing, the membrane material needed to be completely wetted using a test solution (surface tension: 16 mN·m$^{-1}$), and the test gas was nitrogen.

3) Volume porosity of the membrane: The porosity was determined by a gravimetric method, and was calculated according to the following formula, $$\theta = 1 - V_a/V_g,$$

where θ is the volume porosity of the membrane, $V_a$ is the actual volume of polymer solids in the membrane sample per unit area, and $V_g$ is the geometric volume occupied by the polymer layer of the membrane sample per unit area.

4) Recess size and nano-protrusion size: They were measured with a scale in a scanning electron microscope photograph. As the recess size, the diameter of the opening of the recess on the membrane surface in the SEM photograph was measured. As the nano-protrusion size, the diameter of the protrusion particles in the SEM photograph was measured.

5) Oil-water separation performance (oil-water flux, retention rate, oil-water flux after cleaning):

Preparation of oil-in-water emulsion: First, sodium dodecyl sulfate (SDS, with a concentration of 100 mg L$^{-1}$), as an emulsifier, was dissolved in water, and then diesel oil was mixed therein according to the volume ratio of diesel oil to water of 1:99. After mixing, the oil-water mixture was subjected to ultrasonic treatment for 1 h to prepare an emulsified milky emulsion. The diesel oil used was purchased from China Petroleum & Chemical Corporation, with the tradename: No. 0.

Preparation of water-in-oil emulsion: Span 80 (with a concentration of 300 mg L$^{-1}$), as an emulsifier, was added to kerosene, and then water was added, wherein the volume of kerosene and water was controlled at 99:1; after mixing, the oil-water mixture was subjected to ultrasonic treatment for 1 h to prepare an emulsified milky emulsion. The kerosene used was purchased from Aladdin Reagents, with the item number: K118401.

The oil-water separation performance test of the membrane was performed with a cross-flow device. First, the membrane to be tested, with its front upward, was fixed in a cross-flow membrane cell. During the test process, the driving pressure was kept stable. The separation flux of the membrane was calculated by the following formula according to the mass of the filtrate collected within 1 min and the effective separation area:

$$J=m/(A\times t)$$

In the formula, J is the separation flux of the membrane (herein, the oil-water flux); m is the liquid mass permeated in t time; and A is the effective separation area of the membrane. The separation efficiency of the membrane is evaluated by testing the total organic carbon content (TOC) in the filtrate, using a total organic carbon analyzer (Multi NC3100). The calculation formula is as follows:

$$E=(C_0-C)/C_0\times 100\%$$

where E is the separation efficiency (herein, the retention rate) (%); $C_0$ is the TOC value of the emulsion before separation; and C is the TOC value of the filtrate after separation.

The small oil droplets or small water droplets in the oil-water emulsion (O/W) or (W/O) formulated in the oil-water separation experiment had a particle diameter between 0.3 and 3 μm, and most of the oil droplets were in the sub-micron scale, wherein the size was obtained by data analysis via a laser particle size analyzer (DLS). Hydrophilic membrane was used to filter O/W emulsion, and hydrophobic membrane was used to filter W/O emulsion. The test pressure was adjusted between 1 kPa and 0.2 MPa according to different membranes. After one round of test, the test membrane was taken out, rinsed, and tested for its oil-water flux after recovery, i.e., the oil-water flux after rinsing, so as to evaluate its anti-fouling ability and long-term usability.

6) Droplet size in atomized droplet bath: It was determined using a laser particle size analyzer (Model: Bettersize 2000S).

7) Contact angle test: The contact angle test was performed at room temperature (about 25° C.) using a contact angle measuring instrument of the model DSA100 from Kruss, Germany. First, the sample membrane to be tested was fixed on a glass slide, and the membrane surface was ensured to be eyen. When the contact angle of liquid in air was tested, the glass slide attached with the membrane was directly placed on the sample stage of the instrument for testing; and when the contact angle of oil under water was tested, the membrane was wetted and then placed in a quartz water tank filled with water for testing, wherein the oil used in the test was 1,2-dichloroethane. In this experiment, the volume of the test liquid used to test the static contact angle was 3 μL, and the contact angle of the droplet when it was in contact with the membrane surface for 3 s was the value of the contact angle in this test.

2. Raw Materials and Equipment Used in Examples and Comparative Examples

1) The chemical reagents used were all commercially available products without special purification treatment, unless otherwise specified.

Polyacrylonitrile (PAN): purchased from Shaoxing Gimel Composite Materials Co., Ltd., China, with the tradename P60C.

Nano silica: purchased from Aladdin Reagents, with a particle diameter of 30 nm.

Cellulose acetate (CA): purchased from InnoChem Science & Technology Co., Ltd.

Polyvinyldene fluoride (PVDF): purchased from Solyay S.A., with the tradename 6010.

Polystyrene (PS): purchased from Aladdin Reagents, with the product number P107090.

Lithium chloride: purchased from InnoChem Science & Technology Co., Ltd.

Polyvinylpyrroidone: purchased from Macklin, K13-18, with an average molecular weight of 10,000.

Sulfonated polyethersulfone: purchased from Klamar, with the item No. 091343.

Polyethylene glycol: purchased from InnoChem Science & Technology Co., Ltd., with an average molecular weight of 20,000.

Polyethersulfone: purchased from BASF under the tradename E201006.

Polyvinyl alcohol: purchased from Aladdin Reagents, with the model 1788.

Pluronic F-127: polyoxyethylene polyoxypropylene ether block copolymer, purchased from Sigma Reagents.

Nonwoven fabric used: purchased from Hirose, Japan, with the model 75AX, polyester.

2) Spray equipment: High pressure nozzle: SK508 from Huajue Technology Co., Ltd., Dongguan, China; Ultrasonic humidifier: HQ-JS130H from Haoqi, China. The droplet bath was deionized water. By data analysis with a laser particle size analyzer (DLS), the droplet particle diameter in the atomized droplet bath used for the test was substantially in the range of 0.3-10 μm.

Example 1

A specific mass of polyacrylonitrile (PAN) was weighed out and dissolved in N-methylpyrrolidone (NMP), and heated to 60° C. with stirring, until the polyacrylonitrile was sufficiently dissolved, to formulate a raw material solution with a concentration of 8 wt %, which was evacuated for defoaming. The formulated solution was uniformly blade-coated on a non-woven fabric with a doctor blade, with the thickness of the coating film being controlled at 200 μm, followed by staying for 30 s in an atomized droplet bath generated by atomizing deionized water by ultrasonic wave using an ultrasonic humidifier. The above film was then immersed in a deionized water solidification bath for complete phase separation. After washing with water, the membrane was obtained. During the membrane preparation process, the humidity was controlled at a low humidity ambient condition of 20%-35%. The average pore size of the membrane was 269 nm. The volume porosity of the membrane was 65.2%. The membrane could be used as a microfiltration membrane. Oil-water separation experiment was performed using the obtained membrane, and the results are listed in Table 1.

Figure 2:
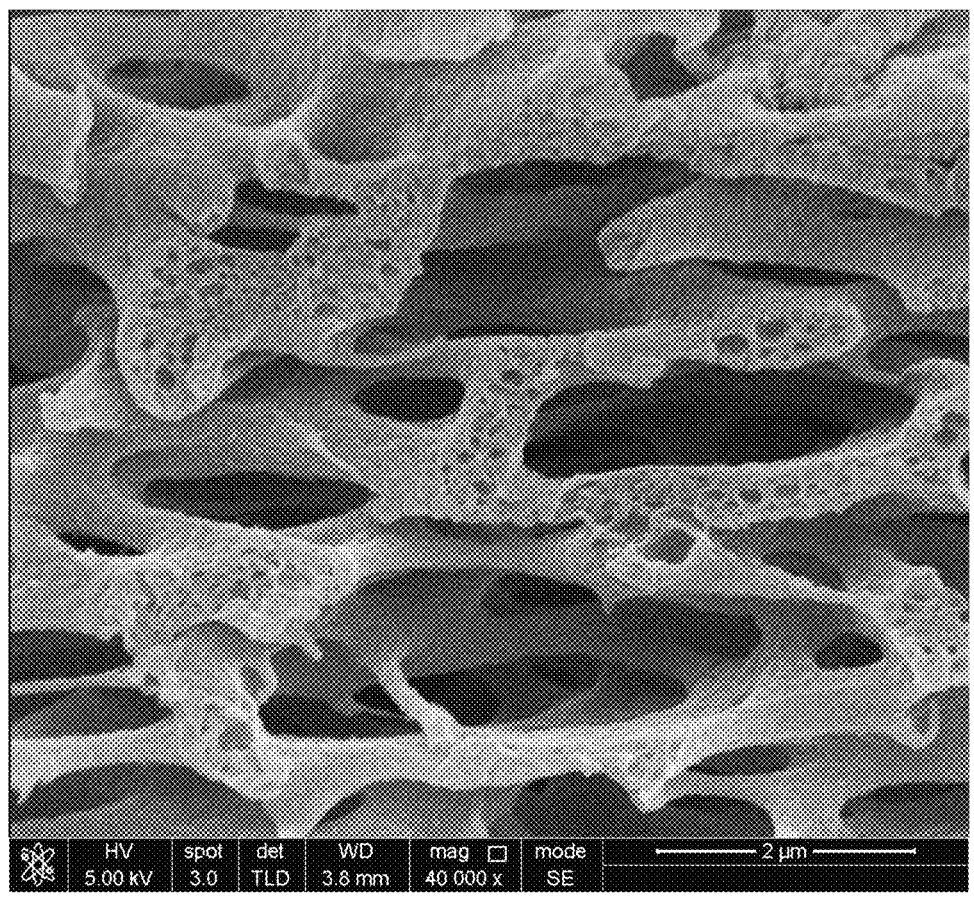
FIG. 2 is a cross-sectional morphological image of the polymer membrane of Example 1.

As observed via SEM, the surface morphology of the membrane obtained in Example 1 is shown in FIG. 1, and the cross-sectional morphology is shown in FIG. 2. It could be seen from the SEM photographs of FIGS. 1 and 2 that the polyacrylonitrile membrane of Example 1 exhibited a loofah sponge-like structure, the surface and the interior of the membrane formed an interpenetrating three-dimensional network pore structure, the polymer fibers of the membrane were interwoven and interconnected to form a three-dimensional fiber network, the surface of the obtained membrane exhibited obvious recess structures, which had a size of 0.5 to 4 µm. The cross-section of the membrane had a structure in which polymer fibers and the same type of pores (network pores) were distributed. The average distance between two adjacent connection points in the thickness direction in the fiber skeletal structure of the membrane was smaller than the average distance between two adjacent connection points in the surface direction. It could be seen from FIG. 2 that the polymer fibers of the obtained membrane had a cavity structure inside them.

Example 2

A specific mass of polyacrylonitrile (PAN) and a specific mass of nano-silica were weighed out, so that the nano-silica was sufficiently dispersed in N,N-dimethylformamide (DMF) in a mass concentration of 2%, and polyacrylonitrile (PAN) was dissolved in N,N-dimethylformamide (DMF) in a mass concentration of 6%; and the mixture was stirred and heated at 60° C. until a homogeneous membrane casting solution was formed, which was evacuated for defoaming. The formulated membrane casting solution was uniformly blade-coated on a non-woven fabric with a doctor blade, with the thickness of the coating film being controlled at 100 µm, followed by staying for 15 s in an atomized droplet bath generated by atomizing deionized water by ultrasonic wave using an ultrasonic humidifier. The above film was then immersed in a deionized water solidification bath for complete phase separation. After washing with water, the membrane was obtained. During the membrane preparation process, the humidity was controlled at a low humidity ambient condition of 30%-38%. The obtained membrane had an average pore size of 314 nm, and a volume porosity of 79.2%. The membrane could be used as a microfiltration membrane.

As observed via SEM, the membrane had a loofah sponge-like structure, and exhibited obvious recess structures on the surface, which recess structures had a size of 0.5 to 5 µm. Oil-water separation experiment was performed using the membrane, and the results are listed in Table 1.

Example 3

A specific mass of cellulose acetate (CA) was weighed out and dissolved in acetone, and stirred to formulate a raw material solution with a concentration of 8 wt %, which was evacuated for defoaming; the formulated solution was uniformly blade-coated on a clean glass plate with a doctor blade, with the thickness of the coating film being controlled at 200 µm, followed by staying for 30 s in an atomized droplet bath generated by atomizing deionized water by ultrasonic wave using an ultrasonic humidifier; the above film was then immersed in a deionized water solidification bath for complete phase separation. After washing with water, the membrane was obtained. During the membrane preparation process, the humidity was controlled at a low humidity ambient condition of 15%-30%. The average pore size of the obtained membrane was 106 nm. The volume porosity of the membrane was 83.1%. The membrane could be used as a microfiltration membrane.

As observed via SEM, the membrane had a loofah sponge-like structure, and exhibited obvious recess structures on the surface, which recess structures had a size of 1 to 4 µm. Oil-water separation experiment was performed using the membrane, and the results are listed in Table 1.

Example 4

A specific mass of polyacrylonitrile (PAN) was weighed out and dissolved in DMF, heated to 60° C., and formulated into a raw material solution with a concentration of 8 wt % under stirring, which was evacuated for defoaming; the formulated solution was uniformly blade-coated on a non-woven fabric with a doctor blade, with the thickness of the coating film being controlled at 200 µm, followed by staying for 35 s in an atomized droplet bath generated by atomizing deionized water by ultrasonic wave using an ultrasonic humidifier; the above film was then immersed in a solidification bath of 1 mol/L aqueous solution of sodium hydroxide for complete phase separation. After washing with water, the membrane was obtained. During the membrane preparation process, the humidity was controlled at a low humidity ambient condition of 20%-35%. The obtained membrane had an average pore size of 435 nm and a volume porosity of 87.9%. The membrane could be used as a microfiltration membrane.

As observed via SEM, the obtained membrane had a loofah sponge-like structure, and exhibited obvious recess structures on the surface, which recess structures had a size of 1 to 5 µm. Oil-water separation experiment was performed using the membrane, and the results are listed in Table 1.

Example 5

A specific mass of polyacrylonitrile (PAN) was weighed out and dissolved in N-methylpyrrolidone (NMP), heated to 60° C., and stirred to formulate a raw material solution with a concentration of 8 wt %, which was evacuated for defoaming; the formulated solution was uniformly blade-coated on a non-woven fabric with a doctor blade, with the thickness of the coating film being controlled at 150 µm, followed by staying for 40 s in an atomized droplet bath generated by atomizing deionized water by ultrasonic wave using an ultrasonic humidifier; the above film was then immersed in a deionized water solidification bath for complete phase separation. After washing with water, the membrane was obtained. During the membrane preparation process, the humidity was controlled at a relatively high humidity ambient condition of 50%-80%. The obtained membrane had an average pore size of 437 nm and a volume porosity of 71.3%. The membrane could be used as a microfiltration membrane.

Figure 3:
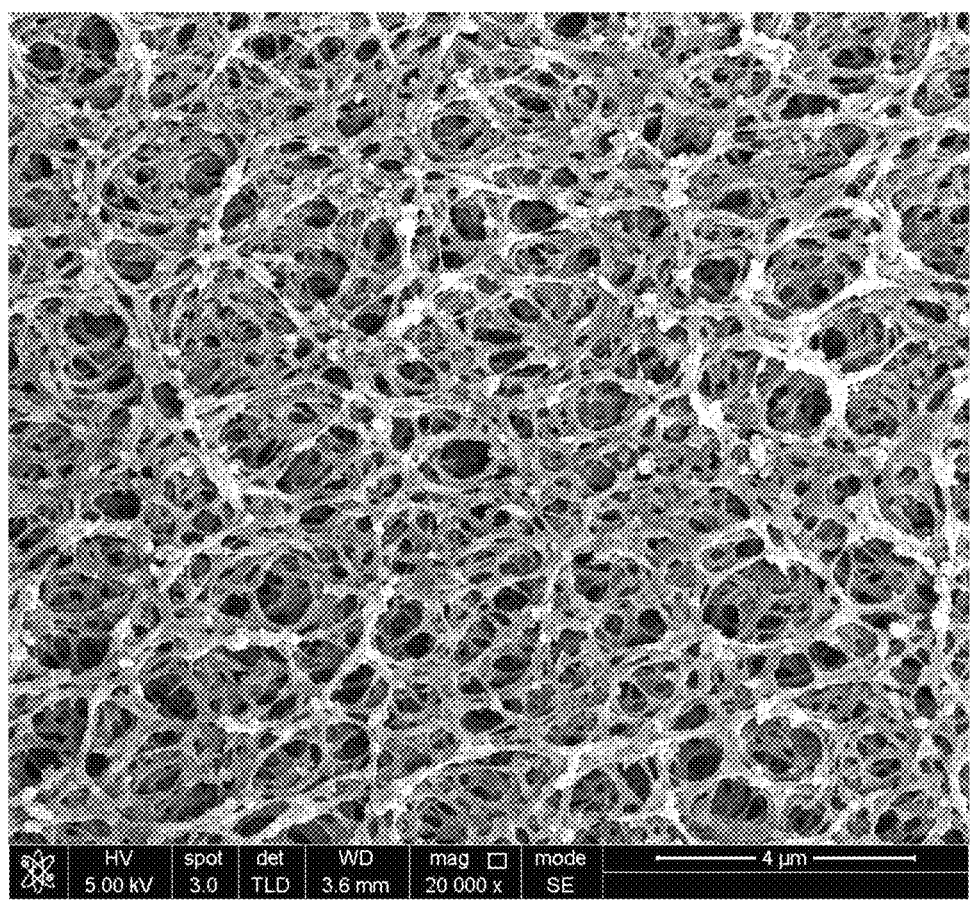
FIG. 3 is a surface morphological image of the polymer membrane of Example 5.
Figure 4:
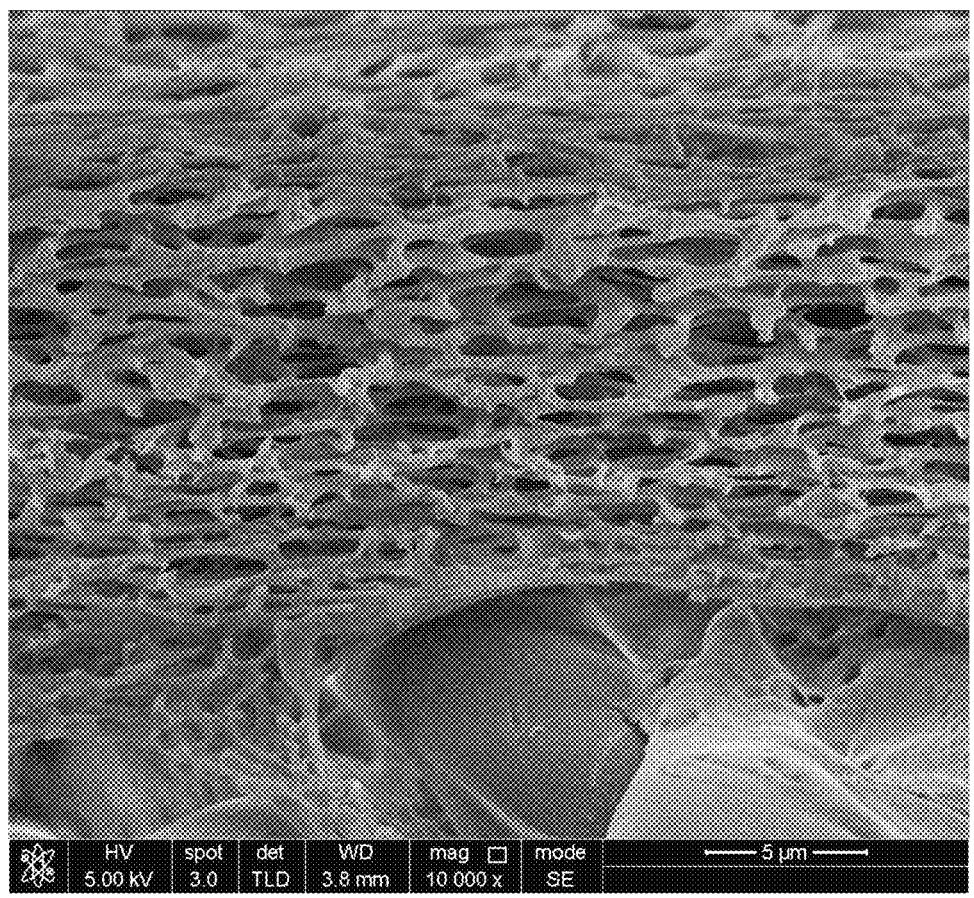
FIG. 4 is a cross-sectional morphological image of the polymer membrane of Example 5.

As observed via SEM, the obtained membrane had no obvious recess structures on the surface. The surface morphology of the obtained membrane is shown in FIG. 3, and the cross-sectional morphology is shown in FIG. 4. It could be seen from the SEM photographs of FIGS. 3 and 4 that the polyacrylonitrile microfiltration membrane of Example 5 exhibited a loofah sponge-like structure, the surface and the interior of the membrane formed an interpenetrating three-dimensional network pore structure, wherein the polymer fibers of the membrane were three-dimensionally interwoven and interconnected to form a three-dimensional fiber network, i.e., the fiber skeletal structure, the cross-section of the membrane had a structure in which polymer fibers and the same type of pores (network pores) were distributed. The average distance between two adjacent connection points in the thickness direction in the fiber skeletal structure of the membrane was smaller than the average distance between two adjacent connection points in the surface direction.

Oil-water separation experiment was performed using the membrane, and the results are listed in Table 1.

Example 6

A specific mass of polyvinylidene fluoride (PVDF) was weighed out and dissolved in N-methylpyrrolidone (NMP), and heated to 70° C. to formulate a raw material solution with a concentration of 8 wt % under stirring, which was evacuated for defoaming; the formulated solution was uniformly blade-coated on a non-woven fabric with a doctor blade, with the thickness of the coating film being controlled at 150 μm, followed by staying for 40 s in an atomized droplet bath generated by atomizing deionized water by ultrasonic wave using an ultrasonic humidifier; the above film was then immersed in a deionized water solidification bath for complete phase separation. After washing with water, the membrane was obtained. The obtained membrane had an average pore size of 487 nm, and a volume porosity of 71.0%. The membrane could be used as a microfiltration membrane. During the membrane preparation process, the humidity was controlled at a relatively high humidity ambient condition of 50%-80%.

Figure 5:
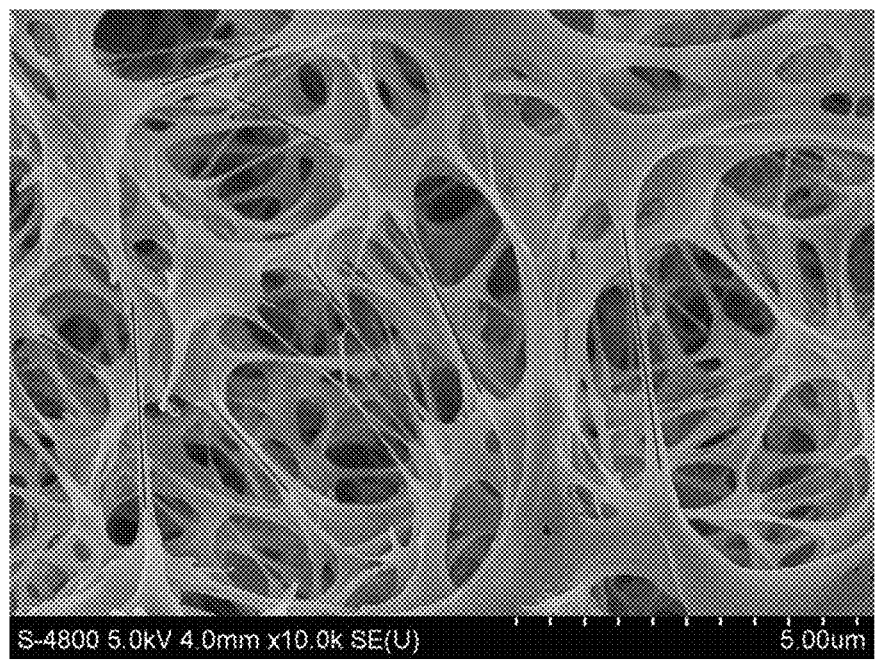
FIG. 5 is a surface morphological image of the polymer membrane of Example 6.
Figure 6:
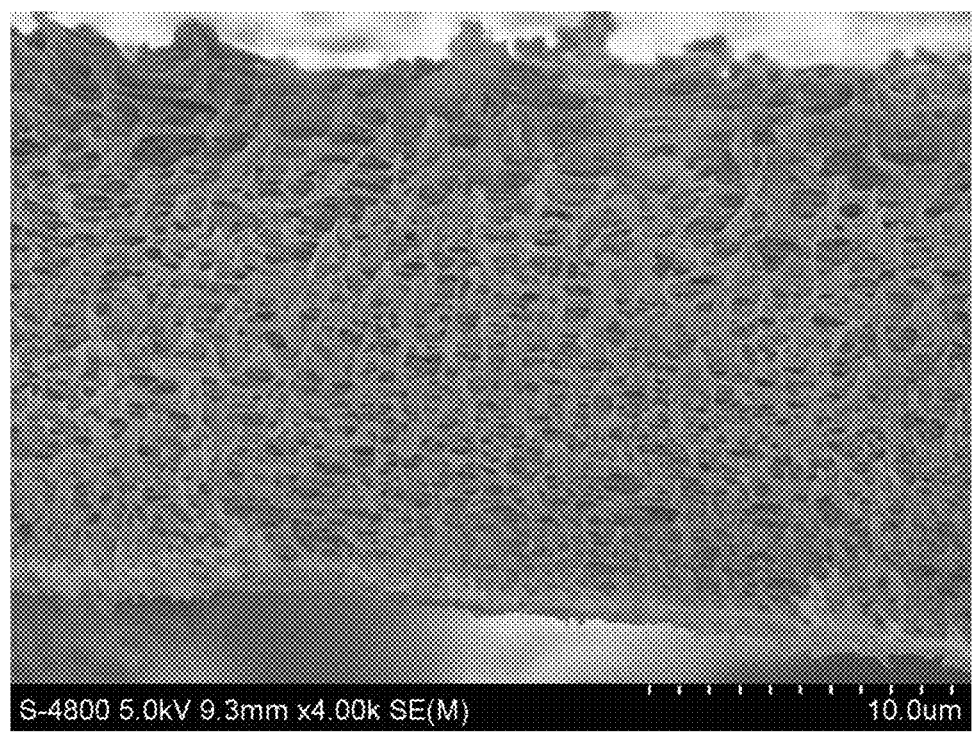
FIG. 6 is a cross-sectional morphological image of the polymer membrane of Example 6.

As observed via SEM, the obtained membrane had no obvious recess structures on the surface. The surface morphology of the membrane obtained in Example 6 is shown in FIG. 5, and the cross-sectional morphology is shown in FIG. 6. It could be seen from the SEM photographs of FIGS. 5 and 6 that the polyvinylidene fluoride microfiltration membrane of Example 6 exhibited a loofah sponge-like structure, the surface and the interior of the microfiltration membrane formed an interpenetrating three-dimensional network pore structure, wherein the polymer fibers of the microfiltration membrane were three-dimensionally interwoven and interconnected to form a three-dimensional fiber network, i.e., the fiber skeletal structure, the cross-section of the microfiltration membrane had a structure in which polymer fibers and the same type of pores (network pores) were distributed. The average distance between two adjacent connection points in the thickness direction in the fiber skeletal structure of the membrane was smaller than the average distance between two adjacent connection points in the surface direction. A single polymer fiber had a length of between 1 and 4 μm, and a fiber diameter of between 50 nm and 0.4 μm.

Oil-water separation experiment was performed using the membrane, and the results are listed in Table 1.

Example 7

A specific mass of lithium chloride and a specific mass of polystyrene (PS) were weighed out, so that lithium chloride was sufficiently dispersed in N,N-dimethylformamide (DMF) in a mass concentration of 0.5%, and polystyrene (PS) was dissolved in N,N-dimethylformamide (DMF) in a mass concentration of 6%; the mixture was heated to 50° C., and stirred until a homogeneous membrane casting solution was formed, which was evacuated for defoaming; the formulated membrane casting solution was uniformly blade-coated on a non-woven fabric with a doctor blade, with the thickness of the coating film being controlled at 150 μm, followed by staying for 30 s in an atomized droplet bath generated by atomizing deionized water by ultrasonic wave using an ultrasonic humidifier; the above film was then immersed in a deionized water solidification bath for complete phase separation. After washing with water, the membrane was obtained. During the membrane preparation process, the humidity was controlled at a relatively high humidity ambient condition of 60%-80%. The obtained membrane had an average pore size of 1217 nm, and a volume porosity of 90.7%. The membrane could be used as a microfiltration membrane.

As observed via SEM, the obtained membrane had a loofah sponge-like structure, and had no obvious recess structures on the surface. Oil-water separation experiment was performed using the membrane, and the results are listed in Table 1.

Comparative Example 1

A specific mass of polyacrylonitrile (PAN) was weighed out and dissolved in NMP, heated to 60° C., and stirred to formulate a raw material solution with a concentration of 8 wt %, which was evacuated for defoaming; the formulated solution was uniformly blade-coated on a non-woven fabric with a doctor blade, with the thickness of the coating film being controlled at 150 μm, followed by immersion in a deionized water solidification bath for complete phase inversion. After washing with water, the membrane was obtained. The membrane had an average pore size of 35 nm, and a volume porosity of 53.7%. Oil-water separation experiment was performed using the membrane, and the results are listed in Table 1.

Figure 7:
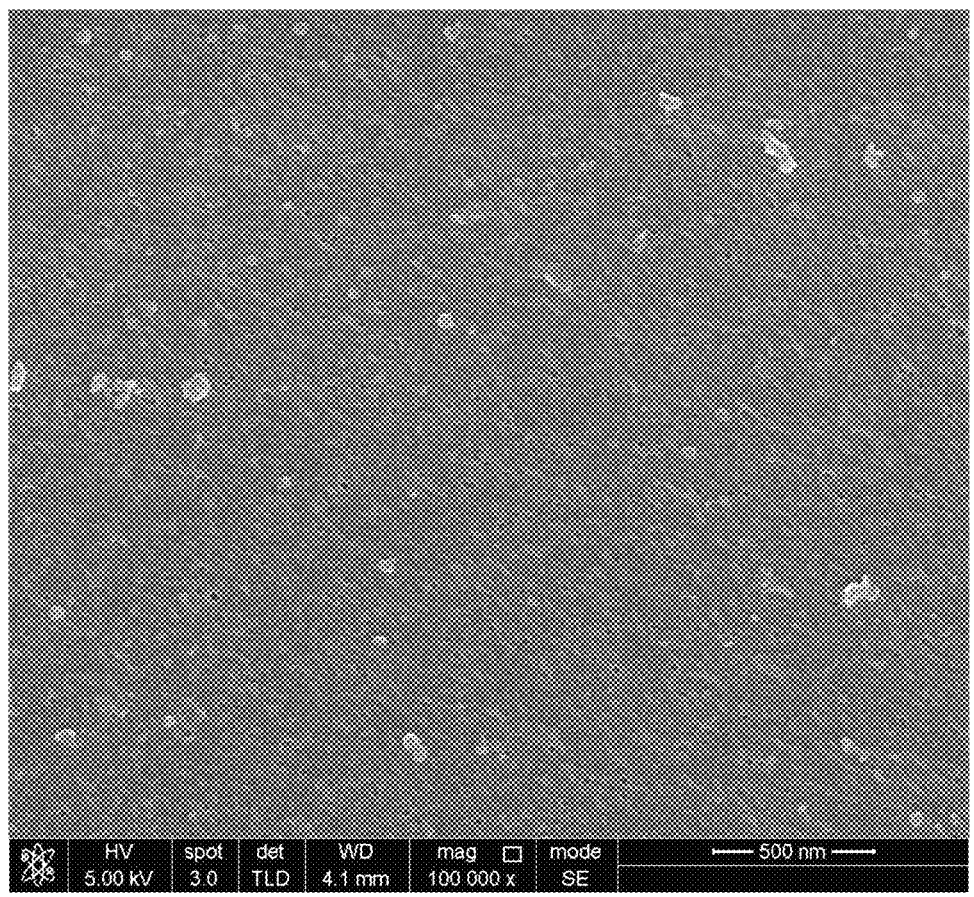
FIG. 7 is a surface morphological image of the polymer membrane of Comparative Example 1.
Figure 8:
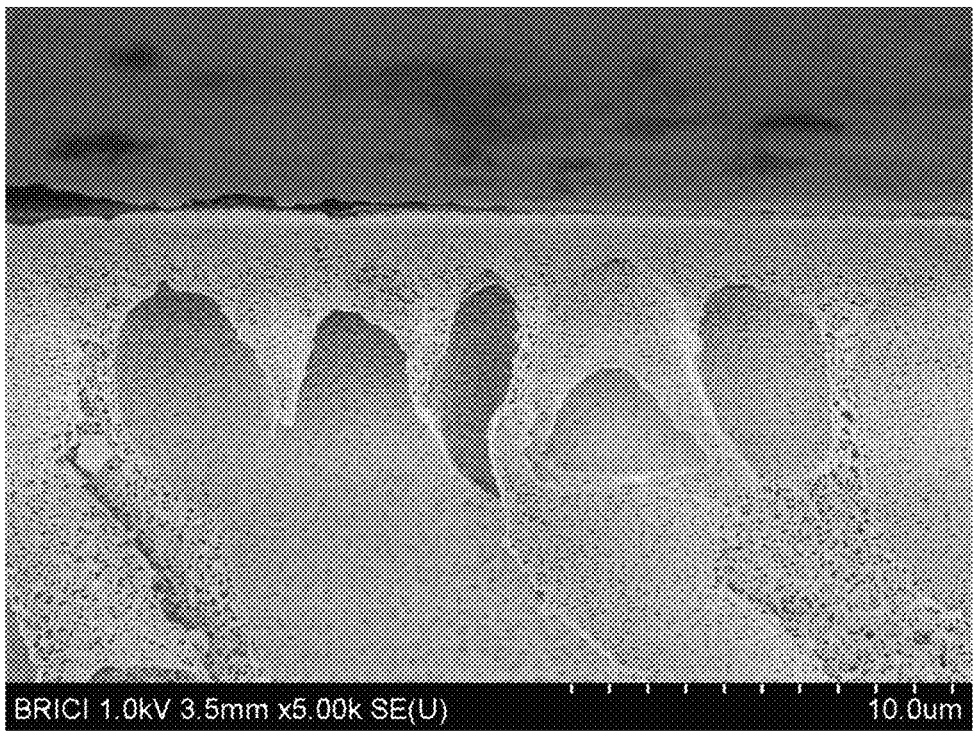
FIG. 8 is a cross-sectional morphological image of the polymer membrane of Comparative Example 1.
Figure 9:
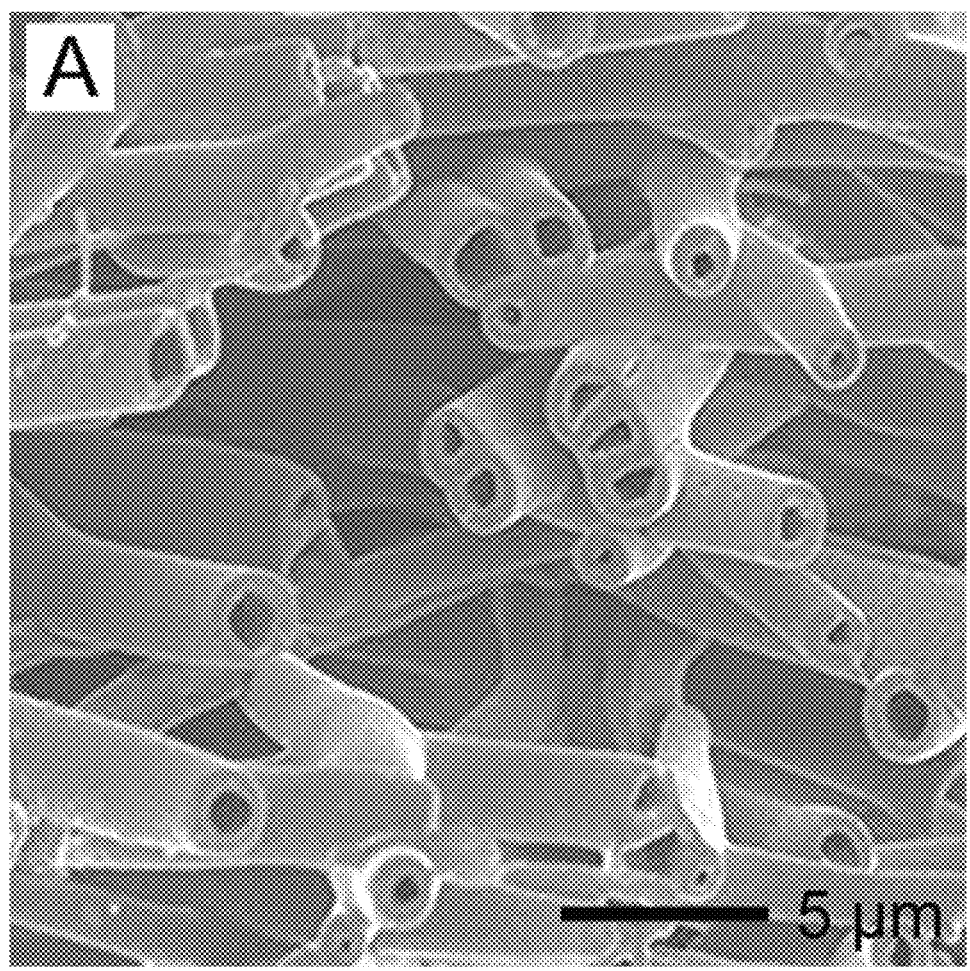
FIG. 9 is a cross-sectional view of a prior art nanofiber membrane.
Figure 10:
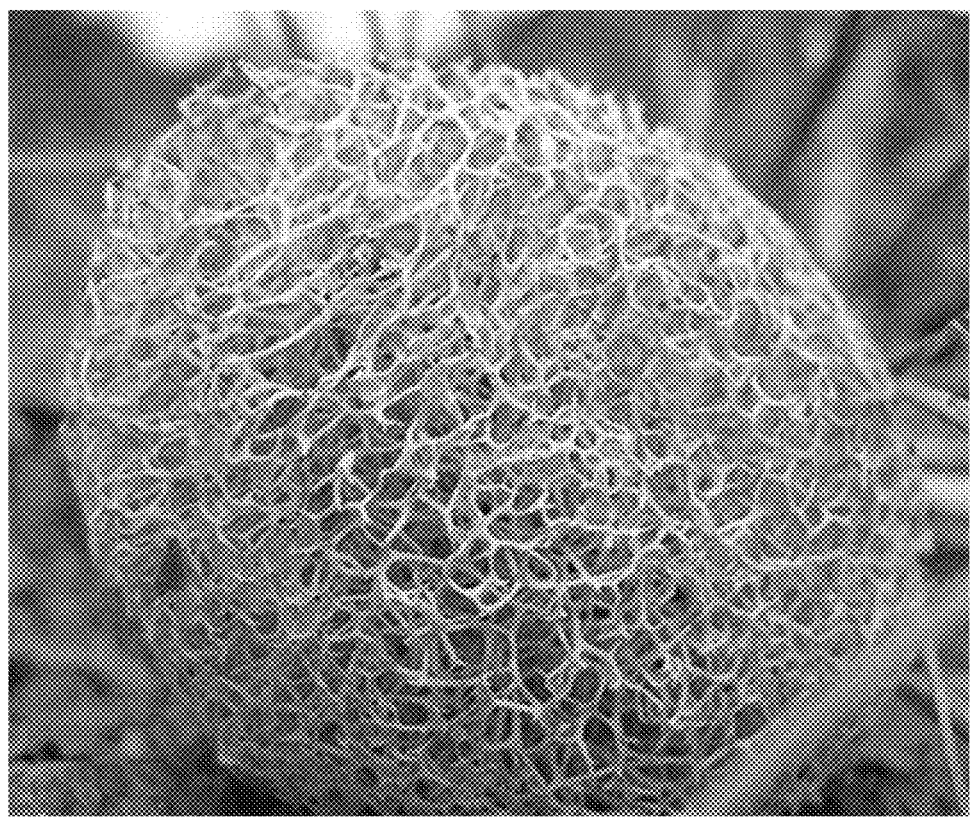
FIG. 10 is a photograph of the morphology of the loofah sponge.

The surface morphology of the membrane of Comparative Example 1 is shown in FIG. 7, and the cross-sectional morphology is shown in FIG. 8. It could be seen from the SEM photographs in FIGS. 7 and 8 that the surface of the membrane was the typical surface morphology of an ordinary flat ultrafiltration membrane, that is, the surface was substantially covered by a flat and even polymer layer, with a small number of small pores distributed thereon; its cross-section was such a combination of a sponge pore structure close to the surface layer of the membrane and a finger-like pore structure at the lower part, thus its overall structure was not a loofah sponge-like structure.

Comparative Example 2

A specific mass of polyacrylonitrile (PAN) was weighed out and dissolved in DMF, heated to 60° C., and stirred to formulate a raw material solution with a concentration of 8 wt %, which was evacuated for defoaming; the formulated solution was uniformly blade-coated on a non-woven fabric with a doctor blade, with the thickness of the coating film being controlled at 200 μm, followed by staying for 40 s in a constant temperature and humidity box at a room temperature of 25° C. and a humidity of 100%; and the above film was then immersed in a deionized water solidification bath for complete phase separation. After washing with water, the membrane was obtained. The membrane had an average pore size of 40 nm, and a volume porosity of 59.1%.

As observed via SEM, the obtained membrane did not have a loofah sponge-like structure. Oil-water separation experiment was performed using the membrane, and the results are listed in Table 1.

Comparative Example 3

A specific mass of cellulose acetate was weighed out and dissolved in NMP, heated to 60° C., and stirred to formulate a raw material solution with a concentration of 8 wt %, which was evacuated for defoaming; the formulated solution was uniformly blade-coated on a non-woven fabric with a doctor blade, with the thickness of the coating film being controlled at 150 μm, followed by immersion in a deionized water solidification bath for complete phase inversion. After washing with water, the membrane was obtained. The membrane had an average pore size of 24 nm, and a volume porosity of 52.8%.

As observed via SEM, the obtained membrane did not have a loofah sponge-like structure. Oil-water separation experiment was performed using the membrane, and the results are listed in Table 1.

Comparative Example 4

A specific mass of polyvinylidene fluoride (PVDF) was weighed out and dissolved in N-methylpyrrolidone (NMP), heated to 70° C., and stirred to formulate a raw material solution with a concentration of 8 wt %, which was evacuated for defoaming; the formulated solution was uniformly blade-coated on a non-woven fabric with a doctor blade, with the thickness of the coating film being controlled at 150 μm; then the above film was immersed in a deionized water solidification bath for complete phase separation. After washing with water, the membrane was obtained. The obtained membrane had an average pore size of 48 nm, and a volume porosity of 61.4%.

As observed via SEM, the obtained membrane did not have a loofah sponge-like structure. Oil-water separation experiment was performed using the membrane, and the results are listed in Table 1.

TABLE 1

Comparison of membrane performance of Examples 1-7 and Comparative Examples 1-4

| Oil-water separation membrane | Oil-water flux (L/(m² · h)) | Retention rate (%) | Oil-water flux after cleaning (L/(m² · h)) |
| --- | --- | --- | --- |
| Example 1 | 998 | 99.5% | 973 |
| Example 2 | 1119 | 99.1% | 1106 |
| Example 3 | 836 | 99.7% | 824 |
| Example 4 | 1372 | 99.0% | 1361 |
| Example 5 | 1255 | 99.0% | 1221 |
| Example 6 | 858 | 98.4% | 839 |
| Example 7 | 1478 | 98.1% | 1459 |
| Comparative Example 1 | 1730 | 30% | 755 |
| Comparative Example 2 | 1620 | 35% | 735 |
| Comparative Example 3 | 1496 | 45% | 841 |
| Comparative Example 4 | 949 | 41% | 716 |

Test pressure: Since the membranes prepared in the inventive examples were microfiltration membranes, the test pressure used for these membranes was 10 kPa; and since the membranes prepared in the comparative examples were ultrafiltration membranes, the test pressure used for these membranes was 0.1 MPa.

As can be seen from the data in Table 1, the membranes having a loofah sponge-like structure prepared in the inventive examples showed a better oil-water separation effect (a higher or equivalent oil-water flux, a higher retention rate, a better or equivalent oil-water flux after cleaning) and had a better anti-fouling ability and long-term usability, compared with the membranes without a loofah sponge-like structure prepared in the non-inventive comparative examples.

From a comparison between the data of Comparative Example 1 and the data of Example 5, and a comparison between the data of Comparative Example 4 and the data of Example 6, it can be seen that under the circumstance of using the same membrane casting solution formulation to prepare a membrane directly by a non-solvent induced phase separation method without an atomization pretreatment, the obtained membrane had a very poor oil-water separation effect (both the retention rate and the oil-water flux after cleaning were relatively low), and microfiltration membrane could not be obtained.

Example 8

8 g of polyacrylonitrile and 8 g of polyvinylpyrrolidone were dissolved in 84 g of N,N-dimethylformamide (DMF); heated and stirred at 50° C. to form a homogeneous solution, which was then evacuated for defoaming; then the resultant was coated on a non-woven fabric, with the thickness of the coating film being controlled at 100 μm, followed by staying for 30 s in an atomized droplet bath generated by atomizing deionized water by ultrasonic wave using an ultrasonic humidifier; the above film was then immersed in a deionized water solidification bath for complete phase separation. After washing with water, the membrane was obtained. During the membrane preparation process, the humidity was controlled at a relatively high humidity ambient condition of 60%-80%. The obtained membrane had an average pore size of 0.8 μm, and a volume porosity of 80.3%. The membrane could be used as a microfiltration membrane.

Figure 11:
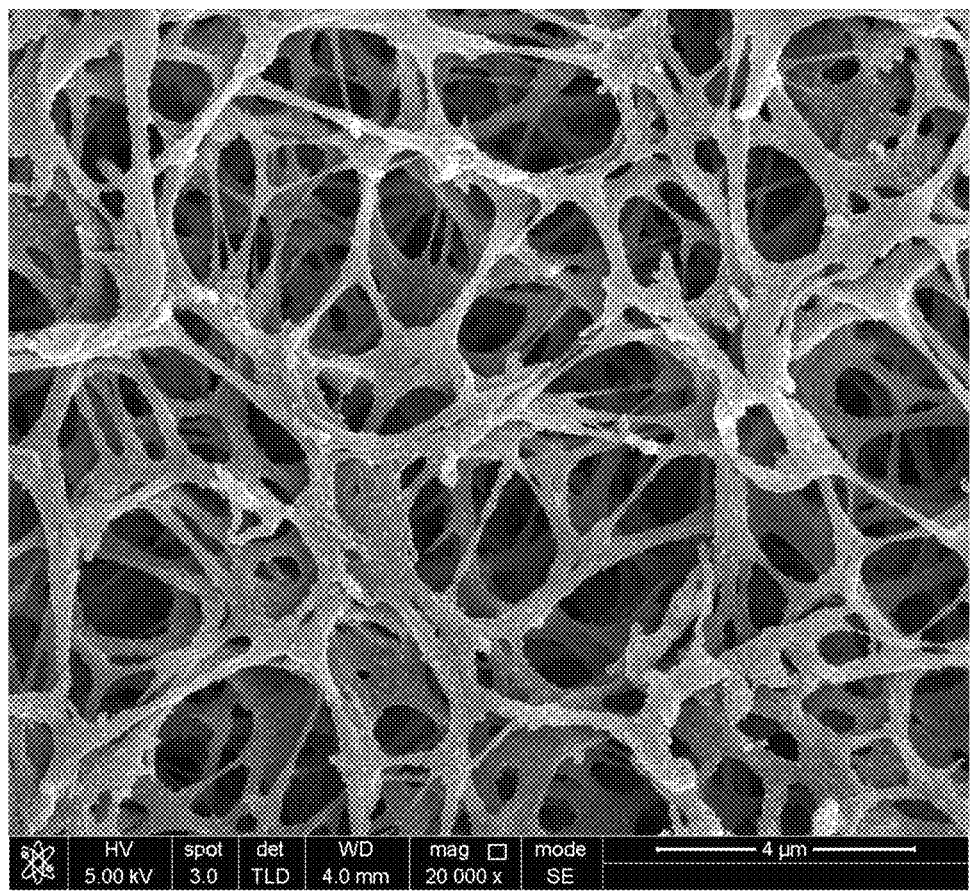
FIG. 11 is a scanning electron microscope photograph of the microfiltration membrane of Example 8.
Figure 12:
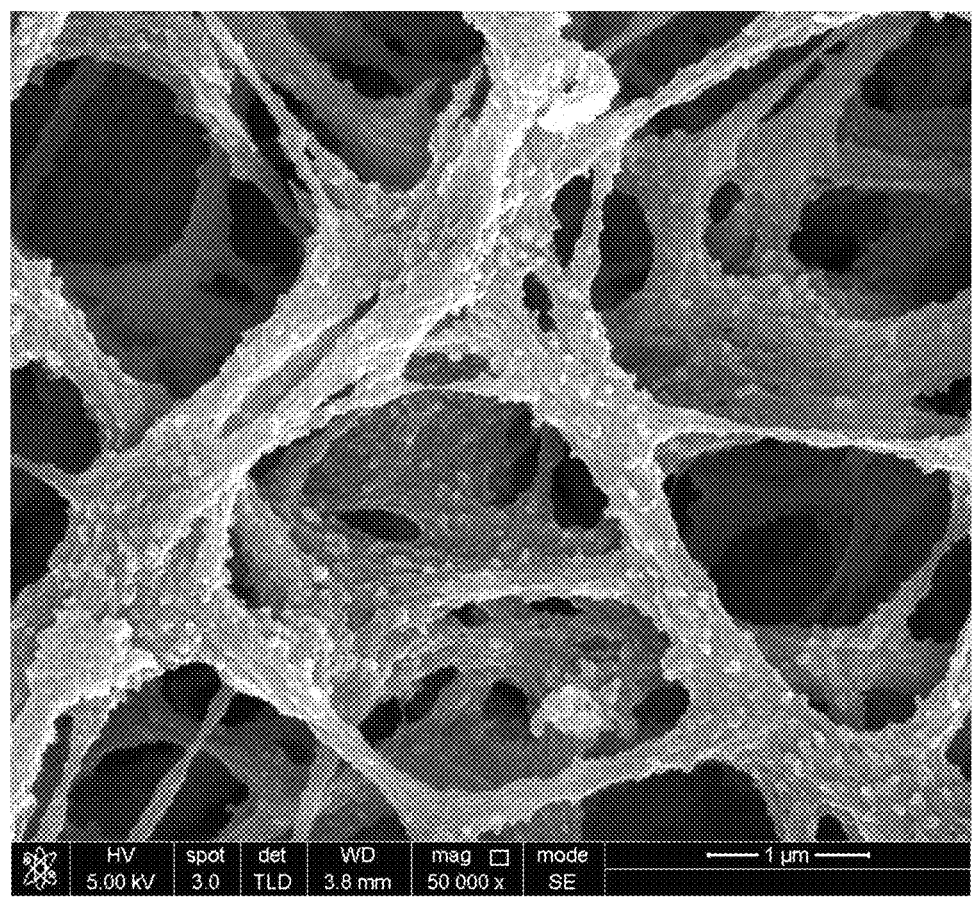
FIG. 12 is a scanning electron microscope photograph of a higher magnification of the microfiltration membrane of Example 8.

The surface morphology of the obtained membrane is shown in FIG. 11 and FIG. 12. It could be seen from the SEM photographs of FIGS. 11 and 12 that the membrane had a loofah sponge-like structure, and the fiber skeletal structure had protrusions distributed thereon, which protrusions had a size of 50 to 250 nm. The membrane exhibited a contact angle of 0° for both oil and water in air, and a contact angle of 165° for oil under water.

Example 9

12 g of sulfonated polyethersulfone and 1 g of polyethylene glycol were dissolved in 87 g of N-methyl-2-pyrrolidone (NMP); heated and stirred at 60° C. to form a homogeneous solution, which was then evacuated for defoaming; then the resultant was coated on a clean glass plate, with the thickness of the coating film being controlled at 300 μm, followed by staying for 10 s in an atomized droplet bath generated by atomizing deionized water by ultrasonic wave using an ultrasonic humidifier; the above film was then immersed in a deionized water solidification bath for complete phase separation. After washing with water, the membrane was obtained. During the membrane preparation process, the humidity was controlled at a relatively high humidity ambient condition of 65%-85%. The obtained membrane had an average pore size of 0.3 μm, and a volume porosity of 86.8%. The membrane could be used as a microfiltration membrane.

As observed via SEM, the obtained membrane had a loofah sponge-like structure, and the fiber skeletal structure had protrusions distributed thereon, which protrusions had a size of 40 to 300 nm. The membrane exhibited a contact angle of 0° for both oil and water in air, and a contact angle of 158° for oil under water.

Example 10

8 g of polyethersulfone and 2 g of polyvinyl alcohol were dissolved in 90 g of dimethyl sulfoxide (DMSO); heated and stirred at 60° C. to form a homogeneous solution, which was then evacuated for defoaming; then the resultant was coated on a non-woven fabric, with the thickness of the coating film being controlled at 150 μm, followed by staying for 2 min in a deionized water droplet bath obtained by atomization of a high-pressure gas flow generated by a high-pressure nozzle; the above film was then immersed in a deionized water solidification bath for complete phase separation. After washing with water, the membrane was obtained. During the membrane preparation process, the humidity was controlled at a relatively high humidity ambient condition of 70%-90%. The obtained membrane had an average pore size of 4 μm, and a volume porosity of 83.8%. The membrane could be used as a microfiltration membrane.

As observed via SEM, the obtained membrane had a loofah sponge-like structure, and the fiber skeletal structure had protrusions distributed thereon, which protrusions had a size of 20 to 50 nm. The membrane exhibited a contact angle of 0° for both oil and water in air, and a contact angle of 152° for oil under water.

Example 11

6 g of polyethersulfone and 10 g of PluronicF-127 were dissolved in 84 g of NMP solvent; heated and stirred at 70° C. to form a homogeneous solution, which was then evacuated for defoaming; then the resultant was coated on a non-woven fabric, with the thickness of the coating film being controlled at 250 μm, followed by staying for 50 s in an atomized droplet bath generated by atomizing deionized water by ultrasonic wave using an ultrasonic humidifier; the above film was then immersed in a deionized water solidification bath for complete phase separation. After washing with water, the membrane was obtained. During the membrane preparation process, the humidity was controlled at a relatively high humidity ambient condition of 70%-99%. The obtained membrane had an average pore size of 4.3 μm, and a volume porosity of 80.9%. The membrane could be used as a microfiltration membrane.

As observed via SEM, the obtained membrane had a loofah sponge-like structure, and the fiber skeletal structure had protrusions distributed thereon, which protrusions had a size of 20 nm to 40 nm. The membrane exhibited a contact angle of 0° for both oil and water in air, and a contact angle of 154° for oil under water.

Example 12

6 g of polyethersulfone and 18 g of polyvinylpyrrolidone were dissolved in 76 g of NMP; heated and stirred at 70° C. to form a homogeneous solution, which was then evacuated for defoaming; then the resultant was coated on a clean glass plate, with the thickness of the coating film being controlled at 100 μm, followed by staying for 20 s in an atomized droplet bath generated by atomizing deionized water by ultrasonic wave using an ultrasonic humidifier; the above film was then immersed in a deionized water solidification bath for complete phase separation. After washing with water, the membrane was obtained. During the membrane preparation process, the humidity was controlled at a relatively high humidity ambient condition of 65%-85%. The obtained membrane had an average pore size of 3 μm, and a volume porosity of 91.3%. The membrane could be used as a microfiltration membrane.

As observed via SEM, the obtained membrane had a loofah sponge-like structure, and the fiber skeletal structure had protrusions distributed thereon, which protrusions had a size of 40 to 200 nm. The membrane exhibited a contact angle of 0° for both oil and water in air, and a contact angle of 155° for oil under water.

Example 13

12 g of cellulose acetate and 10 g of polyethylene glycol were dissolved in 78 g of acetone; heated and stirred at 70° C. to form a homogeneous solution, which was then evacuated for defoaming; then the resultant was coated on a non-woven fabric, with the thickness of the coating film being controlled at 100 μm, followed by staying for 20 s in an atomized droplet bath generated by atomizing deionized water by ultrasonic wave using an ultrasonic humidifier; the above film was then immersed in a deionized water solidification bath for complete phase separation. After washing with water, the membrane was obtained. During the membrane preparation process, the humidity was controlled at a relatively high humidity ambient condition of 60%-80%. The obtained membrane had an average pore size of 1.6 μm, and a volume porosity of 89.6%. The membrane could be used as a microfiltration membrane.

As observed via SEM, the obtained membrane had a loofah sponge-like structure, and the fiber skeletal structure had protrusions distributed thereon, which protrusions had a size of 50 to 300 nm. The membrane exhibited a contact angle of 0° for both oil and water in air, and a contact angle of 158° for oil under water.

Comparative Example 5

8 g of polyacrylonitrile and 8 g of PVP were dissolved in 84 g of NMP, heated to 60° C. and stirred to form a homogeneous solution, which was evacuated for defoaming; the formulated solution was uniformly blade-coated on a non-woven fabric with a doctor blade, with the thickness of the coating film being controlled at 100 μm, followed by immersion in a deionized water solidification bath for complete phase inversion. After washing with water, the membrane was obtained. The obtained membrane had an average pore size of 53 nm, and a volume porosity of 66.0%.

As observed via SEM, the obtained membrane did not have a loofah sponge-like structure, and moreover, the membrane structure had no protrusions thereon. The membrane exhibited contact angles of 40° and 28° for oil and water in air respectively, and a contact angle of 126° for oil under water.

Comparative Example 6

12 g of sulfonated polyethersulfone and 1 g of polyethylene glycol were dissolved in 87 g of NMP; heated and stirred at 60° C. to form a homogeneous solution, which was then evacuated for defoaming; the resultant was then coated on a clean glass plate, with the thickness of the coating film being controlled at 300 μm, followed by staying for 30 s in a constant temperature and humidity box at a temperature of 25° C. and a humidity of 100%; and the above film was then immersed in a deionized water solidification bath for complete phase separation. After washing with water, the membrane was obtained. The obtained membrane had an average pore size of 69 nm, and a volume porosity of 58.2%.

As observed via SEM, the obtained membrane did not have a loofah sponge-like structure, and moreover, the membrane structure had no protrusions thereon. The membrane had a volume porosity of 58%. The membrane exhibited contact angles of 48° and 32° for oil and water in air respectively, and a contact angle of 117° for oil under water.

For the membranes obtained in Examples 8-13 and Comparative Examples 5 and 6, the oil-water separation flux and retention rate were measured, and the results are shown in Table 2.

TABLE 2

Comparison of membrane performance of Examples 8-13 and Comparative Examples 5 and 6

| Oil-water separation membrane | Oil-water flux (L/(m² · h)) | Retention rate (%) | Oil-water flux after cleaning (L/(m² · h)) |
|---|---|---|---|
| Example 8 | 1538 | 99.1% | 1529 |
| Example 9 | 1366 | 99.0% | 1370 |
| Example 10 | 1768 | 99.0% | 1759 |
| Example 11 | 1495 | 99.2% | 1487 |
| Example 12 | 1495 | 99.3% | 1497 |
| Example 13 | 1299 | 99.4% | 1290 |
| Comparative Example 5 | 1620 | 65% | 735 |
| Comparative Example 6 | 2490 | 30% | 1063 |

(Test Pressure of Examples 8-13: 10 kPa; and Test Pressure of Comparative Examples 5 and 6: 0.1 MPa)

From a comparison of the data of Comparative Example 5 and Example 8, it can be seen that under the circumstance of using the same membrane casting solution formulation to prepare a membrane directly by a non-solvent induced phase separation method without an atomization pretreatment, the obtained membrane had a very poor oil-water separation effect, and microfiltration membrane could not be obtained. From a comparison of the data of Comparative Example 6 and Example 9, it can be seen that under the circumstance of first treatment with vapor induced phase separation under a high humidity followed by non-solvent phase inversion, the obtained membrane had a very poor oil-water separation effect, and microfiltration membrane could not be obtained. It can be seen from a comparison of the data of Example 8 and Example 1 that compared with the microfiltration membrane prepared by the method of the present invention using a single polymer, the microfiltration membrane having a micro-nano composite structure prepared by the method of the present invention using a mixture of the two polymers had a better oil-water separation effect.

The invention claimed is:

1. A membrane comprising:
a fiber skeletal structure of three-dimensionally interwoven and interconnected polymer fibers, and nano-scale protrusions which are distributed on and integrally formed with the fiber skeletal structure,
wherein:
the fiber skeletal structure and the nano-scale protrusions comprise a first polymer and a second polymer,
the first polymer is at least one selected from the group consisting of polysulfone, polyethersulfone, sulfonated polyethersulfone, polyacrylonitrile, cellulose acetate, polyvinylidene fluoride, polyimide, acrylonitrile-styrene copolymers, polyvinylidene fluoride modified by acrylic acid grafting, sulfonated polysulfone, maleic anhydride-grafted polysulfone, sulfonated polyethersulfone, and acrylic acid-grafted polyacrylonitrile, and the second polymer is at least one selected from the group consisting of chitosan, polyvinylpyrrolidone, polyethylene glycol, polyvinyl alcohol, and polyoxyethylene polyoxypropylene ether block copolymer;
and
wherein:
a three-dimensionally interpenetrating network pore structure is distributed in the fiber skeletal structure, an average pore size of the pores is in a range of 0.1 μm to 10 μm,
a size of protrusions is in the range of from 20 to 400 nm, and
a volume porosity of the membrane is 50%-95%.

2. The membrane according to claim 1, wherein the volume porosity of the membrane is 65% to 95%.

3. The membrane according to claim 1, wherein the average pore size of the pores is from 0.1 to 5 μm.

4. The membrane according to claim 1, wherein the average distance between two adjacent connection points in the thickness direction in the fiber skeletal structure of the membrane is smaller than the average distance between two adjacent connection points in the surface direction.

5. The membrane according to claim 1, wherein a cross-section of the membrane has three-dimensionally interpenetrating network pores distributed along a thickness direction of the membrane and has substantially no other types of pores.

6. The membrane according to claim 1, wherein
a cross-sectional diameter of a single polymer fiber between two connection points in the fiber skeletal structure of the membrane is less than or equal to 2 μm; and/or
a length of a single polymer fiber between two connection points in the fiber skeletal structure of the membrane is less than 10 μm.

7. The membrane according to claim 1, wherein each of the polymer fibers has an inner cavity.

8. The membrane according to claim 1, wherein the surface of the membrane has micro/sub-micron sized recess structures, with loofah sponge-like structures distributed on or around or among the recess structures.

9. The membrane according to claim 1, wherein, in the membrane, a weight ratio of the first polymer to the second polymer is 1:(0.01 to 5).

10. The membrane according to claim 1, wherein the membrane has a micro-nano composite network structure comprising at least two hydrophilic polymers, and the membrane is super-hydrophilic and super-lipophilic in air.

11. The membrane according to claim 1, wherein the membrane has a micro-nano composite network structure comprising at least two hydrophobic polymers, and the membrane is super-hydrophobic in air.

12. The membrane according to claim 1, wherein the membrane further comprises additives selected from inorganic nanoparticles and inorganic salt porogens.

13. The membrane according to claim 1, wherein the membrane comprises a support layer.

14. A method for preparing a membrane, comprising:
1) dissolving at least a first polymer and a second polymer in a good solvent to form a membrane casting solution;
2) applying the membrane casting solution in the form of a film, exposing the film to a bath of atomized droplets for a period of time, wherein the atomized droplets are droplets of a first poor solvent for the first polymer; and 3) immersing the film obtained from step 2) in a solidification bath to obtain the membrane, wherein the solidification bath comprises a second poor solvent for the first polymer, wherein the first polymer is at least one selected from the group consisting of polyvinyl chloride, polysulfone, polyethersulfone, sulfonated polyethersulfone, polyacrylonitrile, cellulose acetate, polyvinylidene fluoride, polyimide, acrylonitrile-styrene copolymers, polyvinylidene fluoride modified by acrylic acid grafting, sulfonated polysulfone, maleic anhydride-grafted polysulfone, sulfonated polyethersulfone, and acrylic acid-grafted polyacrylonitrile, and the second polymer is at least one selected from the group consisting of chitosan, polyvinylpyrrolidone, polyethylene glycol, polyvinyl alcohol, and polyoxyethylene polyoxypropylene ether block copolymer, wherein the good solvent is selected from the group consisting of N,N-dimethylformamide, N-methylpyrrolidone, N,N-dimethylacetamide, dimethyl sulfoxide, tetrahydrofuran, dioxane, acetonitrile, acetone, chloroform, toluene, benzene, hexane, octane, tetramethyl sulfoxide, and mixtures thereof, and the first and the second poor solvents for the first polymer are independently selected from the group consisting of water, ethanol, ethylene glycol, a mixed solvent containing water, and a solution containing a salt, an acid or a base; and wherein the resulting membrane comprises:

a fiber skeletal structure of three-dimensionally interwoven and interconnected polymer fibers, pores distributed in the fiber skeletal structure having an average pore size in a range of 0.1 μm to 10 μm, and nano-scale protrusions distributed on the fiber skeletal structure having a size in the range of from 20 to 400 nm, and a volume porosity of the membrane is 50%-95%.

15. The method according to claim 14, wherein the bath of atomized droplets is generated by a method selected from the group consisting of pressure atomization, rotary disk atomization, high-pressure airflow atomization, sonic atomization, and ultrasonic wave atomization.

16. The method according to claim 14, wherein:

in step 2), the size of the droplets in the droplet bath is 1 to 50 μm; and/or in step 2), the period of time is 1 s to 20 min.

17. The method according to claim 14, wherein step 2) is carried out in an ambient humidity of greater than or equal to 40% at room temperature.

18. The method according to claim 14, wherein step 2) is carried out in an ambient humidity of less than 40% at room temperature, and the membrane has micro/sub-micron sized recess structures.

19. The method according to claim 14, wherein:

in step 1), a total concentration of the polymers in the membrane casting solution is 6 to 30 wt %.

20. The method according to claim 15, wherein the membrane casting solution is uniformly coated on a support layer selected from a fabric.

21. A functional material comprising a membrane according to claim 1, wherein the functional material is used for the fields of gas filtration, liquid filtration, oil-water separation, adsorption materials, catalysis, pharmaceutical sustained release materials, anti-adhesion coatings, oil delivery or oil spill interception.

22. The membrane according to claim 8, wherein the recess structure has a size of 0.5 to 10 μm.

23. The membrane according to claim 10, wherein the membrane has a contact angle to both water and oil in air of less than 10°, and a contact angle to oil under water of greater than 135°.

24. The membrane according to claim 11, wherein the membrane has a contact angle to water in air of greater than 130°, and a contact angle to oil under water of smaller than 10°.

25. The membrane according to claim 12, wherein the inorganic nanoparticles are selected from the group consisting of $MnO_2$, $SiO_2$, and ZnO; and the inorganic salt porogens are selected from the group consisting of LiCl, $ZnCl_2$, $MgCl_2$, and LiBr.

26. The method according to claim 14, wherein in step 2), the thickness of the film as applied is in the range of from 50 to 500 μm.

27. The method according to claim 20, wherein the support layer is a nonwoven fabric.

28. The method according to claim 20, wherein the method is a roll-to-roll continuous process.

29. The functional material according to claim 21, wherein the functional material is an oil-water separation membrane or a microfiltration membrane.

* * * * *